(12) United States Patent
Ito et al.

(10) Patent No.: US 9,002,619 B2
(45) Date of Patent: Apr. 7, 2015

(54) APPARATUS FOR CONTROLLING A VEHICLE

(75) Inventors: Yasushi Ito, Susono (JP); Shouji Katsumata, Gotemba (JP); Keiji Yoeda, Numazu (JP); Hideyuki Nishida, Shizuoka-ken (JP); Shiro Tanno, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 925 days.

(21) Appl. No.: 12/676,438

(22) PCT Filed: Nov. 28, 2008

(86) PCT No.: PCT/JP2008/071675
§ 371 (c)(1),
(2), (4) Date: May 6, 2010

(87) PCT Pub. No.: WO2009/069758
PCT Pub. Date: Jun. 4, 2009

(65) Prior Publication Data
US 2010/0235069 A1    Sep. 16, 2010

(30) Foreign Application Priority Data

Nov. 28, 2007  (JP) ................. 2007-307189

(51) Int. Cl.
*B60T 7/12*      (2006.01)
*G05D 1/00*      (2006.01)
(Continued)

(52) U.S. Cl.
CPC .............. *F02B 29/083* (2013.01); *F02B 3/06* (2013.01); *F02B 29/0406* (2013.01); *F02B 37/00* (2013.01);
(Continued)

(58) Field of Classification Search
CPC ................ F02D 41/0002; F02D 2041/0002; F02D 2141/0015; F02D 9/00; F02D 9/105; F02D 11/105; F02D 11/107; F01L 2710/006
USPC ......... 701/103, 108; 123/90.11, 90.15, 90.24, 123/346, 348, 337, 349, 351, 352, 361, 376, 123/377, 399, 402, 403
See application file for complete search history.

(56) References Cited

U.S. PATENT DOCUMENTS 5,014,548 A * 5/1991 Tomisawa ................. 73/114.32
5,150,679 A * 9/1992 Peter ........................... 123/397
(Continued)

FOREIGN PATENT DOCUMENTS

JP   A-59-158343   9/1984
JP   A-01-280653   11/1989
(Continued)

OTHER PUBLICATIONS

International Search Report issued in International Application No. PCT/JP2008/071675; Mailed on Mar. 3, 2009.

*Primary Examiner* — Hieu T Vo
*Assistant Examiner* — Sherman Manley
(74) *Attorney, Agent, or Firm* — Oliff PLC

(57) ABSTRACT

It is possible to suppress fluctuations of an air intake amount when the open degree of an air intake control valve is unknown. An engine includes an impulse valve common to all the cylinders arranged in the engine. The impulse valve is arranged in a communicating tube provided at the downstream side of a serge tank. An ECU executes impulse valve drive control. In the control, the ECU judges whether a rotation angle sensor which detects the open degree of the impulse valve has failed. If it is judged that the rotation angle sensor has failed, the ECU controls a drive motor and a drive circuit for driving a valve body so that a valve body of the impulse valve rotates inside the communicating tube. Here, the rotor of the drive motor which defines the rotation speed of the valve body has an rpm which is set in accordance with the mechanical rpm NE of the engine.

6 Claims, 6 Drawing Sheets

(51) Int. Cl.
  *G06F 7/00* (2006.01)
  *G06F 17/00* (2006.01)
  *F02B 29/08* (2006.01)
  *F02D 41/00* (2006.01)
  *F02D 41/22* (2006.01)
  *F02B 3/06* (2006.01)
  *F02B 29/04* (2006.01)
  *F02B 37/00* (2006.01)

(52) U.S. Cl.
  CPC .......... *F02D 41/0002* (2013.01); *F02D 41/222* (2013.01); *F02D 2041/227* (2013.01); *F02D 2200/0404* (2013.01); *Y02T 10/146* (2013.01); *Y02T 10/42* (2013.01)

(56) References Cited

U.S. PATENT DOCUMENTS

| | | | |
|---|---|---|---|
| 5,889,204 A * | 3/1999 | Scherer et al. | 73/114.37 |
| 5,896,839 A * | 4/1999 | Togai | 123/295 |
| 5,950,597 A * | 9/1999 | Kamio et al. | 123/397 |
| 5,960,771 A * | 10/1999 | Watanabe | 123/396 |
| 6,047,679 A * | 4/2000 | Matsumoto et al. | 123/396 |
| 6,073,610 A * | 6/2000 | Matsumoto et al. | 123/396 |
| 6,116,214 A * | 9/2000 | Ishida | 123/399 |
| 6,199,535 B1 * | 3/2001 | Hara | 123/396 |
| 6,622,695 B2 * | 9/2003 | Kondo | 123/336 |
| 6,681,742 B1 * | 1/2004 | Hirayama et al. | 123/399 |
| 6,751,544 B2 * | 6/2004 | Hashimoto et al. | 701/107 |
| 6,935,308 B1 * | 8/2005 | Nakamoto et al. | 123/395 |
| 7,121,258 B2 * | 10/2006 | Nakamoto et al. | 123/399 |
| 7,222,016 B2 * | 5/2007 | Snowbarger et al. | 701/114 |
| 7,403,847 B2 * | 7/2008 | Matsuda et al. | 701/54 |
| 7,451,644 B2 * | 11/2008 | Karte | 73/168 |
| 7,526,911 B2 * | 5/2009 | Pickard et al. | 60/39.281 |
| 7,584,643 B2 * | 9/2009 | Hoffman | 73/1.72 |
| 7,603,980 B2 * | 10/2009 | Watanabe | 123/399 |
| 7,997,251 B2 * | 8/2011 | Bauerle et al. | 123/399 |
| 8,160,790 B2 * | 4/2012 | Oshima et al. | 701/62 |
| 8,311,700 B2 * | 11/2012 | Murakami | 701/33.7 |
| 8,527,137 B2 * | 9/2013 | Sakakibara | 701/29.2 |
| 8,577,575 B2 * | 11/2013 | Tomura et al. | 701/70 |
| 2004/0103880 A1 * | 6/2004 | Hirayama et al. | 123/350 |
| 2005/0178355 A1 * | 8/2005 | Soshino et al. | 123/337 |
| 2005/0183696 A1 * | 8/2005 | Soshino et al. | 123/399 |
| 2007/0240679 A1 * | 10/2007 | Tabata et al. | 123/348 |
| 2007/0240680 A1 * | 10/2007 | Muto et al. | 123/396 |
| 2008/0196487 A1 * | 8/2008 | Suzuki | 73/114.34 |
| 2009/0205610 A1 * | 8/2009 | Jumonji et al. | 123/337 |
| 2009/0211554 A1 * | 8/2009 | Tabata et al. | 123/435 |
| 2011/0023852 A1 * | 2/2011 | Yamashita | 123/574 |

FOREIGN PATENT DOCUMENTS

| | | |
|---|---|---|
| JP | A-02-301630 | 12/1990 |
| JP | U-03-017141 | 2/1991 |
| JP | A-03-229946 | 10/1991 |
| JP | A-03-275935 | 12/1991 |
| JP | A-04-330331 | 11/1992 |
| JP | A-07-083101 | 3/1995 |
| JP | A-11-324687 | 11/1999 |
| JP | A-2005-076552 | 3/2005 |
| JP | A-2006-112382 | 4/2006 |

* cited by examiner

APPARATUS FOR CONTROLLING A VEHICLE

TECHNICAL FIELD

The present invention relates to an apparatus for controlling a vehicle which has an internal combustion engine provided with an intake control valve which can generate the pulsation of intake air.

BACKGROUND ART

As this type of apparatus, there has been suggested an apparatus which responds to the abnormality of a rotary valve in an engine which uses the rotary valve as an intake control valve (e.g. refer to a patent document 1). According to the rotary valve engine disclosed in the patent document 1 (hereinafter referred to as a "conventional technology"), a cylinder closed by the rotary valve is identified and fuel supply to the closed cylinder is stopped on the basis of the detection signal of a rotation angle sensor attached to the rotary valve. Thus, even if the rotary valve is abnormally stopped, troubles caused by an accidental fire, a standing fuel, and the like will be likely dissolved. Moreover, at this case, a connection path, which is appropriately connected to each intake path which is connected to each cylinder, in accordance with the rotation angle of the rotary valve, is configured to open one of the said intake paths always. Thus, even if the rotary valve is abnormally stopped, an engine stop will be likely avoided.

Incidentally, there has been also suggested such an apparatus that when the failure of the rotary valve is detected, an intake air amount is controlled by a rotary valve which is not broken, with the broken rotary valve fixed at an open position (e.g. refer to a patent documents 2).

Moreover, there has been also suggested a technology of stopping the fuel supply to the cylinder that fails in the opening and closing operation and of increasing a fuel supply amount to the remaining cylinders, in a pulse supercharging valve provided for each cylinder (e.g. refer to a patent document 3).

Patent Document 1: Japanese Patent Application Laid Open No. Hei 3-229946
Patent Document 2: Japanese Patent Application Laid Open No. Hei 11-324687
Patent Document 3: Japanese Patent Application Laid Open No. Hei 4-330331

DISCLOSURE OF INVENTION

Subject to be Solved by the Invention

In the conventional technology, if the rotation angle sensor has broken down, it is hard to recognize the closed cylinder or to recognize whether or not the rotary valve is in an abnormal situation. Thus, it is practically impossible to determine the cylinder that the fuel supply is to be stopped. Therefore, even if the physical structure of the communication channel is set to give an intake air to any of the cylinders when the rotary valve is in the abnormal situation, it is hard to avoid the occurrence of the troubles described above. Such problems are caused by having no way to specify whether or not the rotation angle sensor has broken down. Thus, whether the rotation angle sensor is individually provided in each cylinder or commonly provided in the cylinders, there is no essential difference.

On the other hand, even if the presence or absence of the failure of the rotation angle sensor is merely detected, there is no change that the rotation angle is unknown, and it is impossible to significantly drive this type of intake control valve in practice in the conventional technology in which there is no alternative but to perform the control according to the rotation angle.

Thus, in the conventional technology, whether the intake control valve is individually provided in each cylinder or commonly provided in the cylinders, or whether the intake control valve itself is normal or abnormal, it is hard to obtain the output expected at least in one portion of the cylinders when the rotation angle sensor has broken down. In other words, the conventional technology has such a technical problem that it is hard to avoid output fluctuation, rotational fluctuation, or the like, as the entire internal combustion engine, in the abnormal state of the rotation angle sensor.

In view of the aforementioned problems, it is therefore an object of the present invention to provide an apparatus for controlling a vehicle, which can limit the output fluctuation or rotational fluctuation of the internal combustion engine when the degree of the opening of the intake control valve is unknown.

Means for Solving the Subject

The above object of the present invention can be achieved by an apparatus for controlling a vehicle provided with an internal combustion engine which is provided with a plurality of cylinders and intake control valves, at least one of which is disposed in a path of intake air connected to inside of the plurality of cylinders, which can generate pulsation of the intake air in accordance with an opening/closing state and can adjust an intake air amount as an amount of the intake air, and in which the opening/closing state is controlled without seating by abutment by predetermined opening/closing control at least in a normal situation; and detecting devices which are provided in a one-to-one manner together with the intake control valves, which define the opening/closing state, and which can detect degree of opening of the intake control valve referred to when the opening/closing control is performed, the apparatus having: a judging device for judging whether or not the detecting device is in a failure state; and a limiting device for limiting fluctuation of the intake air amount in a target cylinder as at least one portion of the plurality of cylinders corresponding to the detecting device which is judged to be in the failure state if it is judged that the detecting device is in the failure state.

The "internal combustion engine" of the present invention conceptually includes such a mechanism that has the plurality of cylinders and that a force generated in the explosion or combustion of fuel, such as gasoline, light oil, and various alcohols, or an air-fuel mixture including the fuel in a combustion chamber in each of the cylinders can be extracted as a drive force through physical or mechanical transport pathway, such as a piston, a connecting rod, and a crank shaft. For example, the internal combustion engine indicates two-cycle or four-cycle reciprocating engine or the like. Moreover, in particular, the internal combustion engine of the present invention is provided with at least one intake control valve in the path for supplying the intake air of the present invention into each cylinder (hereinafter referred to as an "intake path" as occasion demands), wherein the intake air conceptually includes gas sucked into the cylinders (i.e. including a suction air as the air sucked from the outside world, as at least one portion).

The intake control valve provided in the intake path is such a device that can adopt a form of a valve operating mechanism, a valve operating apparatus, or the like, that includes a valve plug, a driving apparatus for driving the valve plug, or the like as occasion demands, that can at least generate the pulsation of the intake air, and that can adjust the intake air amount, which is the amount of the intake air, in accordance with the opening/closing state controlled in a binary manner, step by step, or continuously. Here, the "intake air" of the present invention indicates the gas sucked into the cylinders as described above, and it is the suction air itself as a preferred embodiment; however, if an exhaust gas re-circulating apparatus such as an EGR apparatus is provided, it may be a mixture of an EGR gas (i.e. exhaust gas) and the suction air according to circumstances (e.g. according to the opening/closing state of a flow control device, such as an EGR valve). The intake control valve is disposed on the downstream side of an intake throttle valve (i.e. which is the concept of a direction on the basis of a direction of flowing the suction air, and which is the cylinder side in this case), as a preferred embodiment, if the internal combustion engine is provided with the so-called intake throttle valve, such as a throttle valve.

Incidentally, the installation aspect of the intake control valve in the internal combustion engine of the present invention can adopt various types of forms in accordance with the physical structure or the like of the intake path. For example, if an intake system including the intake path is constructed as a so-called intake manifold less system without an intake manifold, then, the intake control valve may be provided to be shared or held in common by at least the plurality of cylinders, in the intake path shared or held in common by at least the plurality of cylinders (including, of course, all the cylinders) as a preferred embodiment, wherein the intake manifold conceptually includes a pipe member or the like having a physical structure which can compensate a difference the intake air amount among the cylinders, a difference in the transmission aspect of the pulsation, or the like, which is caused by a difference or the like in physical position relation between each cylinder and an accumulating device for temporally pooling a suction air, such as a surge tank, which is not necessarily provided and which is some accumulating device that can supply the intake air to each cylinder with an almost constant pressure, as a wider concept. Alternatively, whether the intake system is the intake manifold less system or it has the intake manifold, one portion of the intake path eventually corresponds to each cylinder in a one-to-one manner (the same is true even if there are a plurality of intake ports), so that the intake control valve may be individually disposed in the intake path corresponding to each of the plurality of cylinders such that the intake control valve corresponds to each of the plurality of cylinders. Moreover, if the internal combustion engine is provided with the aforementioned surge tank or the like as the accumulating device for temporarily accumulating the suction air, then, the intake control valve may be disposed on the downstream side of the surge tank, as a preferred embodiment.

In any cases, the intake control valve is mainly aimed at sending the intake air to each cylinder as a pulsating wave, wherein the intake air can be taken into the cylinder, basically as the pulsating wave, with or without the intake control valve as a preferred embodiment, hut the pulsation generated by the intake control valve is stronger than this type of pulsation as a preferred embodiment. However, for example, apart from the generation of this type of pulsation, if the intake control valve can adjust the amount of the suction air (i.e. narrow or reduce the intake air) which can be preferably performed without practical problems by the opening/closing operation or the like of the intake throttle valve, such as a throttle valve, then, the action of the intake throttle valve, such as a throttle valve, may be substituted by the intake control valve of the present invention. Conversely, the intake throttle valve may substitute the function as the intake control valve of the present invention. The intake control valve is disposed at a position which is close to the intake air valve and which is close enough to generate the pulsation of the intake air at least practically sufficiently by the opening/closing of the intake control valve as a preferred embodiment, wherein the position is not necessarily defined by an absolute distance, and for example, the acceptable value and the optimum value can vary depending on the state of a negative pressure on the downstream side of the intake control valve, the physical shape of the surge tank, the diameter of the intake path, or the like.

To the internal combustion engine provided with the intake control valve, as described above, regardless of whether there is provided with a single or a plurality of intake control valves, inertia supercharging using the pulsation of the intake air (also referred to pulse supercharging or impulse charging or the like) is possible. Moreover, for example, by controlling the opening/closing timing of the intake control valve, valve opening period, of opening degree (which is the degree of valve opening and which uniquely defines the opening/closing state) (e.g. by performing the control, such as synchronising a portion corresponding to the top or crest of the pulsating wave of the intake air with the vicinity of the valve opening timing of the intake valve), it is possible to take a larger amount of intake air into the cylinder in the intake stroke, in comparison with a case of natural aspiration. Moreover, the intake control valve can adjust the intake air amount in any aspects of the opening/closing state. For example, the intake control valve can reduce a pumping loss by intake-air quick closing control, which substantially blocks the flow of the intake air in the middle of the valve opening period of the intake valve.

Here, the opening/closing state of the intake control valve of the present invention is controlled by predetermined opening/closing control, which is determined to significantly receive the benefits by the aforementioned inertia supercharging effect and the pumping loss reduction effect or the like, without any troubles in practice, on the basis of experiments, experiences, theories, simulations or the like in advance at least in the normal situation. Whether or not it has a physical, mechanical, mechanistic, or electrical structure that allows the intake control valve to be seated by abutment, the intake control valve is controlled without through the seating by the abutment at least in the normal state. Moreover, in the opening/closing control, the degree of opening of the intake control valve is referred to, regardless of how to control the opening/closing state of the intake control valve (i.e. in a binary manner, step-by-step, or continuously). The degree of opening of the intake control valve is detected by the detecting device which can adopt a form of a resolver, a rotation angle sensor, or the like, and which is provided in one-to-one manner together with the intake control valve.

According to the apparatus for controlling a vehicle of the present invention, in its operation, it is judged whether or not the detecting device is in the failure state, by the judging device which can adopt forms of various computer systems, such as various processing units like ECU (Electronic Control Unit), various controllers, microcomputer apparatuses, and the like.

If the detecting device has various physical, mechanical, mechanistic, or electrical troubles, of if the detecting device falls into substantially the same state due to control troubles or the like, then, whether they are temporary or permanent, the degree of opening of the intake control valve is hardly or cannot be detected, or the reliability of the detected degree of opening is reduced. Thus, it is hard to perform the aforementioned opening/closing control, which is performed with reference to the degree of opening.

Here, the "failure state" in the judgment operation of the judging device conceptually includes a state of the detecting device in which the detected degree of opening does not have reliability at least practically enough to perform the aforementioned opening/closing control with respect to the intake control valve, and it may result from various reasons, such as physical, mechanical, mechanistic, or electrical reasons, or control reasons. The judgment aspect by the judging device is, in effect, not limited at all as long as it is possible to judge the presence or absence of this type of failure state in order not to actualize some problems at least in practice (as a preferred embodiment, for example, in order to reduce a possibility that the detecting device is misjudged to be in the failure state although it is not in the failure states, as much as possible, and in order to make the quick judgment at least when it is in the failure state). For example, the judging device judges that the detecting device is in the failure state when various signals or the like which can be outputted by the detecting device in accordance with the detected degree of opening and which indicates an electric current value, voltage value, electric power value, or the like, have a value that is known for not being outputted from the detecting device in the normal state, on the basis of experiments, experiences, theories, simulations or the like in advance. The judging device may judge that the detecting device is in the failure state when the supply of the aforementioned various signals or the like is stopped from the detecting device (i.e. there is likely breaking wire or similar situations). The judgment operation of the judging device may be performed with a constant or irregular period at a certain degree of time intervals, or in real time (which is substantially equivalent to a case where the judgment period is extremely short).

Here, in particular, in a case where it is judged that the intake control valve is in the failure state, if no measures are taken, it is reasonable not to drive the intake control valve corresponding to the detecting device which is in the failure state (i.e. a target intake control valve), or it is reasonable to maintain and fix a control amount which defines the drive state, at a value at that time point. If it is not driven, the target intake control valve can ideally adopt the degree of opening in the non-driving, which can be determined in the structure of the intake control valve in advance. If the control amount is maintained and fixed, ideally, the degree of opening at that time point can be maintained. In any cases, however, it is hard to avoid the fluctuation of the intake air to some extent, in comparison with a case where the opening/closing control is performed in the normal situation.

Moreover, the detecting device being in the failure state is inherently different from whether or not the target intake control valve normally operates (however, it is also hard to judge whether or not the target intake control valve has a failure if the detecting device is in the failure state), and it is not always necessary to stop the drive of the target intake control valve even when the detecting device is in the failure state. However, it is hard to avoid the fluctuation of the intake air amount even if the opening/closing control is performed on the target intake control valve in the situation that the degree of opening to be referred to is unknown.

Therefore, in any cases, in the target cylinder, which is the cylinder corresponding to the detecting device in the failure state, the output fluctuation or rotational fluctuation are easily actualized in comparison with a case where the detecting device is not in the failure state (i.e. a case where the detecting device is in a normal situation, and the normal state is substantially equivalent to the aforementioned normal situation). The output fluctuation or rotational fluctuation at least in one cylinder will eventually cause the output fluctuation or rotational fluctuation as the entire internal combustion engine.

Thus, according to the apparatus for controlling a vehicle of the present invention, in its operation, if it is judged that the detecting device is in the failure state through the judgment process by the judging device, the fluctuation of the intake air in the target cylinder (which may be a single cylinder in some cases or a plurality of cylinders in some cases, depending on the installation aspect of the intake control valve) is limited by the limiting device which can adopt forms of various computer systems, such as various processing units like ECU, various controllers, microcomputer apparatuses, and the like. The structure and operation aspect of the limiting device which can limit the fluctuation of the intake air amount are not limited at all as long as it is possible to limit the fluctuation of the intake air amount, and it may be with or without the drive of the target intake control valve. The fluctuation of the intake air amount may be limited, absolutely or relatively.

Here, the "fluctuation of the intake air amount" indicates the fluctuation of the intake air amount in one cylinder (uniquely, which can be the fluctuation of the intake air amount among the cylinders) if the intake control valve is provided for each cylinder in one-to-one manner. Moreover, if the intake control valve is a single intake control valve which is shared by all the cylinders, the fluctuation of the intake air amount indicates the fluctuation of the intake air amount in the entire internal combustion engine. The fluctuation of the intake air amount has different meanings depending on the installation aspect of the intake control valve; however, in any cases, there is no difference in that it may be a factor for the output fluctuation and rotational fluctuation of the internal combustion engine. Moreover, in the internal combustion engine, regardless of whether output control based on the intake air amount such as air-fuel ratio control is performed (i.e. in this case, the internal combustion engine may be a gasoline engine as a preferred embodiment) or output control based on a fuel injection amount is performed (i.e. in this case, the internal combustion engine may be a diesel engine as a preferred embodiment), there is no difference in that the fluctuation of the intake air amount may cause the output fluctuation or rotational fluctuation although an emission state (e.g. type, emission amount, or the like) can be different between the two output controls. Therefore, in any cases, the output fluctuation or rotational fluctuation of the internal combustion engine is limited at least to some extent by limiting the fluctuation of the intake air amount. In other words, according to the apparatus for controlling a vehicle of the present invention, even if the degree of opening of the intake control valve is unknown, the output fluctuation or rotational fluctuation of the internal combustion engine will be likely limited.

In one aspect of the apparatus for controlling a vehicle of the present invention, the limiting device controls a target intake control valve as the intake control valve corresponding to the detecting device which is judged to be in the failure state, such that at least it is not fixed in a fully-closed state which blocks a supply of the intake air to the target cylinder.

If the target intake control valve is in the fully-closed state, the supply of the intake air to the target cylinder is blocked, so that the fluctuation of the intake air amount is substantially maximal. Specially, for example, if the intake manifold less system (or intake system without an intake manifold) of a one-valve type is adopted in which the supply of the intake air to the plurality of cylinders (e.g. all the cylinders) is satisfied by the single intake control valve, then, file output of the internal combustion engine is likely extremely reduced (if the target cylinder is all the cylinders, i.e. in the worst case, the engine output will be zero) due to the plurality of target cylinders. At this time, by controlling the intake control valve such that the target intake control valve is not fixed in the fully-closed state, the worst case that the intake air is not supplied to the target cylinder at all is avoided, and the fluctuation of the intake air amount is limited to some extent. Thus, it is possible to limit the output fluctuation or rotational fluctuation of the internal combustion engine.

At this time, the opening/closing state of the intake control valve in the non-driving (e.g. upon the non-application of current if the intake control valve is electrically driven), which can adopt various types of forms in accordance with the physical, mechanical, mechanistic, or electrical structure of the intake control valve and control reasons or the like, does not interfere with the fluctuation reduction effect of the intake air amount provided by the limiting device.

In addition, if the intake control valve adopts the fully-closed state in the non-driving (considering the purpose of the inertia supercharging, such a structure is preferable from a practical point of view), it is reasonable not to drive the target intake control valve when it is judged that the detecting device is in the failure state (i.e. there is no meaning to drive the target intake control valve without any guidelines in the situation that the degree of opening is unknown). In view of the above, the fluctuation of the intake air amount becomes substantially maximal, as described above, so that the limiting device provides the large befit in practice.

On the other hand, if the intake control valve adopts the fully-opened state in the non-driving, or if the control amount is fixed such that the degree of opening of the target intake control valve is maintained at the degree of opening at that time point when it is judged that the detecting device is in the failure state, then, there is a possibility that the intake air amount is ensured, ideally to the same extent that there is no intake control valve, or at least to some extent, if the effect of the inertia supercharging is ignored. In such cases, the fluctuation of the intake air amount is relatively small from the beginning (e.g. to the extent that is due to the presence or absence of the inertia supercharging). Thus, even if the target intake control valve is controlled not to be in the fully-closed, state, the actual fluctuation of the intake air amount is likely not necessarily limited. Moreover, even if an intermediate state between the fully-opened state and the fully-closed state is adopted, there would be the same possibility to a greater or lesser extent.

However, in the situation that the detecting device is judged to be in the failure state, the actual degree of opening of the target intake control valve is completely unknown as described above. Thus, regardless of whether the target intake control valve adopts the fully-opened state or the intermediate state in the non-driving, or whether the degree of opening is maintained, there is no guarantee that the target intake control valve is actually in the fully-opened state or the intermediate state or that the degree of opening is maintained. In other words, as long as the actual degree of opening of the target intake control valve is unknown, even if the target intake control valve is simply not driven, or even if the control amount is simply fixed to maintain the degree of opening, it is hardly possible to eliminate the possibility that the target intake control valve is in the fully-closed state. Therefore, in the situation that the degree of opening is unknown, there is a need to surely supply the intake air at least to the target cylinder to some extent, as consideration to safety. In that point, by controlling the target intake control valve not to be fixed at least in the fully-closed state (i.e. the degree of opening is no longer unknown at the time point of "not being in the fully-closed state"), the fluctuation of the intake air amount is preferably reduced, regardless of the actual intake air amount.

In another aspect of the apparatus for controlling a vehicle of the present invention, the limiting device limits the fluctuation of the intake air by restricting a maximum value of request output of the internal combustion engine.

According to this aspect, as a preferred embodiment, the maximum value of the request output of the internal combustion engine is restricted, for example, by setting a constant or variable upper limit value.

If the maximum value of the request output is restricted to some extent, then, the required intake air amount itself is reduced, regardless of whether the output control of the internal combustion engine is based on the intake air amount or the fuel injection amount (i.e. whether it is to maintain the air-fuel ratio or to limit the generation of smoke or the like). Thus, in comparison with a case where the request output is not restricted, the intake air amount can be reduced to some extent. If the intake air amount can be reduced as the entire internal combustion engine, then, the fluctuation of the intake air amount is limited as a necessity at least on an absolute scale (e.g. fluctuation amount). Moreover, even when the limiting device has such a structure that the fluctuation of the intake air amount is limited by another method, the fluctuation of the intake air amount is limited more effectively by restricting the intake air amount required by the restrictions on the request output.

Incidentally, if the output control based on the intake air amount is performed, the request output and the intake air amount have a unique relation, and the restrictions on the request output influence the reduction in the fluctuation of the intake air amount, more directly. If the output control based on the fuel injection amount is performed, the restrictions on the request output does not always cause the reduction in the intake air amount (i.e. it is better to have a more intake air amount in such output control, and at least, there is no need to restrict the intake air amount). However, if no restrictions are imposed on the request output, the fluctuation of the intake air amount further increases when the more intake air amount is required (e.g. in supercharging operation or the like) from the purpose of expanding the generation limit of smoke or the like. In particular, if a supercharger such as a turbocharger is provided, a target supercharging pressure is set higher in order to increase the suction air amount. Therefore, the fluctuation of the intake air amount in the target cylinder relatively increases by that much. By restricting the request output, at least such a situation is prevented, so that the fluctuation of the intake air amount is also limited in that case. Moreover, if the supercharger is provided, the restrictions on the request output interfere with an increase in supercharging pressure to some extent. If the increase in supercharging pressure is inhibited, a speed of increasing the intake air amount is reduced, so that the fluctuation of the intake air amount is limited, more positively.

Incidentally, the upper limit value of the request output may be a fixed value or a variable value, or it may be mapped and stored in advance, or it may be derived individually and specifically at each time. Alternatively, the upper limit value may be set cooperatively such that the fluctuation of the intake air amount can be significantly limited while a driver's will is reflected as much as possible, on the basis of experiments, experiences, theories, simulations, or the like in advance.

Incidentally, in this aspect, the vehicle may have an operating device which can be operated by a driver and in which an operation amount associated with the operation is associated with the request output, and the limiting device may restrict a maximum value of the operation amount.

In this case, the operation amount of the operating device, which is constructed as an accelerator pedal or the like as a preferred embodiment, is restricted. The restrictions on the operation amount may be performed in an arbitrary manner, as long as a numerical value eventually treated as the operation amount is restricted. For example, a physical operation (e.g. an operation of the accelerator pedal) itself may be restricted, or an operation amount corresponding to the driver's operation may be restricted. For example, in the former case, the driver can recognize that there is a trouble in the intake control valve, and for example, such a feeling of discomfort or dissatisfaction that the output does not increase regardless of the request for the output is prevented. In other words, deviation between the request output as the driver's will and the request output in the control is limited. On the other hand, in the latter case, although the driver can feel uncomfortable with the deviation between the driver's will and the request output (or engine output based on the request output), sooner or later, the driver can figure out that it is caused by the trouble of the intake control valve, so that there is no problem. In addition, in this case, it is not necessary to add any physical, mechanical, mechanistic, or electrical device to the operating device, such as an accelerator pedal, so that an increase in cost can be limited. Anyway, in this case, the maximum value of the request output can be restricted, relatively easily, so that practically high benefits associated with the limit of the fluctuation of the intake air amount is provided.

In another aspect of the apparatus for controlling a vehicle of the present invention, the intake control valve can rotate in a predetermined direction with a change in the degree of opening, and the limiting device controls a target intake control valve to rotate if it is judged that the detecting device is in the failure state.

According to this aspect, the intake control valve can be rotated by some physical, mechanical, mechanistic, electrical, or magnetic driving device in the predetermined direction (which is not necessarily one direction) in the intake path, and the degree of opening of the intake control valve changes, continuously or step by step, by rotating the target intake control valve. Therefore, even if the actual degree of opening of the target intake control valve is unknown, at least the target intake control valve is not fixed in a valve closing state, so that it is possible to limit the fluctuation of the intake air amount.

In addition, if the target intake control valve is rotated, then, regardless of the rotation aspect, the amount of the intake air supplied to the target cylinder can be at least substantially equivalent to the amount of the intake air when the target intake control valve is fixed at one degree of opening, which can be determined in accordance with the rotation aspect. In other words, the rotation of the target intake control valve is substantially equal to that the target intake control valve is fixed at one degree of opening, which changes in accordance with the rotation aspect, i.e. a rotation speed as a preferred embodiment. For example, if a correlation between the rotation aspect (e.g. rotation speed) and the substantial degree of opening (e.g. average degree of opening in a certain period) is obtained on the basis of experiments, experiences, theories, simulations, or the like in advance, or if the correlation can be derived, it is possible to substantially control the degree of opening of the target intake control valve although the detecting device is in the failure state. As described above, the rotation control of the target intake control valve in this aspect is essentially different from driving the target intake control valve without any guideline with respect to the degree of opening, and the effect is clearly more advantageous than in that case.

Incidentally, in this aspect, it may have a change rate setting device for setting a rotation speed associated with the rotation in accordance with an engine rotation speed of the internal combustion engine, the limiting device controls the target intake control valve to rotate at the set rotation speed.

According to this aspect, by the change rate setting device which can adopt forms of various computer systems, such as various processing units like ECU (Electronic Control Unit), various controllers, microcomputer apparatuses, and the like, the rotation speed of the target intake control valve is set as a speed according to the engine rotation speed, and the target intake control valve is rotated at the set rotation speed. Therefore, it is possible to further reduce the fluctuation of the intake air amount in the target intake control valve. Incidentally, at this time, a relation between the engine rotation speed and the rotation speed of the target intake control valve may be determined on the basis of experiments, experiences, theories, simulations, or the like in advance, such that the fluctuation of the intake air amount in the target intake control valve can be limited more finely and accurately than a case where the rotation speed is constant, such that energy resources required for the rotation of the target intake control valve can be consumed as highly efficiently as possible, and such that the physical, mechanical, mechanistic, or electrical deterioration of the target intake control valve can be prevented as possible. Incidentally, considering that an absolute time required for one intake stroke is reduced in accordance with an increase in the engine rotation speed, and considering that the intake air amount is to be ensured at least to some extent, the expression of "in accordance with the engine rotation speed" indicates that at least the increase and decrease in the engine rotation speed correspond to an increase and decrease in the rotation speed, step by step or continuously.

In another aspect of the apparatus for controlling a vehicle of the present invention, it has: a specifying device for specifying a predetermined index value defined as correlating with the intake air amount in advance; and a target value setting device for setting a target value of the index value, the limiting device controls a target intake control valve such that the specified index value converges on the set target value.

According to this aspect, by the specifying device which can adopt forms of various computer systems, such as various processing units like ECU, various controllers, microcomputer apparatuses, and the like, the index value is specified which correlates with the intake air amount including the intake air amount itself, such as a suction air amount and a supercharging pressure. On the other hand, by the target value setting device which can adopt forms of various computer systems, such as various processing units like ECU, various controllers, microcomputer apparatuses, and the like, the target value is set in a form of being associated with the engine rotation speed, load, or the like. The limiting device controls the target intake control valve such that the specified index value converges on the set target value. For example, the limiting device feedback-controls the control amount of the target intake control valve, as a preferred embodiment.

The target value of the index value is originally unrelated to whether or not the detecting device is in the failure state, and it is obvious that the fluctuation of the intake air amount is reduced as deviation between the index value and the target value is reduced. Therefore, according to this aspect, even if the degree of opening of the target intake control valve is unknown, it is possible to obtain the same effects as in a case where the opening/closing control is performed on the basis of the detected degree of opening in practice, so that the output fluctuation or rotational fluctuation is preferably limited.

Moreover, the expression of "specify" in the present invention is conceptually and widely includes: obtaining or detecting a specification target or a physical quantity or physical state which correlates with the specification target, for example, as an electric signal, a physical change, or the like, directly or indirectly through some detecting device; selecting a relevant value from a map or the like stored in a proper memory device or the like in advance, on the basis of the directly or indirectly obtained or detected physical quantity or physical state which correlates with the specification target; and performing derivation or estimation in accordance with algorithm, calculating formulas, or the like set in advance, from the obtained, detected, or selected physical quantity or physical state which correlates with the specification target. Therefore, the specifying device may specify the index value by obtaining at least one portion of respective index values defected by various sensors, such as an airflow meter, a supercharging pressure sensor, an intake air pressure sensor, an in-cylinder pressures sensor, and an air-fuel ratio sensor, for example, as an electric signal or the like.

In another aspect of the apparatus for controlling a vehicle of the present invention, it has an estimating device for estimating degree of opening of the target intake control valve, the limiting device controls a target intake control valve to limit the fluctuation of the intake air amount on the basis of the estimated degree of opening.

According to this aspect, by the estimating device which can adopt forms of various computer systems, such as various processing units like ECU, various controllers, microcomputer apparatuses, and the like, the degree of opening of the target intake control valve is estimated and the fluctuation of the intake air amount is limited on the basis of the estimated degree of opening. Thus, the fluctuation of the intake air amount is limited, efficiently and effectively.

In one aspect of the apparatus for controlling a vehicle of the present invention provided with the estimating device, it has a specifying device for specifying a predetermined index value defined as correlating with the intake air amount in advance, the estimating device estimates the degree of opening of the target intake control valve on the basis of the specified index value.

According to this aspect, the index value which correlates with the intake air amount described above is specified by the specifying device, and the degree of opening of the target intake control valve is estimated on the basis of the index value. The index value correlates with the intake air amount, and the intake air amount depends on the degree of opening. Thus, the degree of opening of the target intake control valve is specified at least with a practically sufficient accuracy by obtaining the correlation between the index value and the degree of opening on the basis of experiments, experiences, theories, simulations, or the like in advance. If the degree of opening of the target intake control valve is estimated, then, it is possible to easily control the degree of opening of the target intake control valve such that at least the fluctuation of the intake air amount is limited, so that it is practically useful.

In another aspect of the apparatus for controlling a vehicle of the present invention provided with the estimating device, the limiting device controls the target intake control valve such that the degree of opening is maintained at a predetermined value on the basis of the estimated degree of opening.

According to this aspect, the degree of opening of the target intake control valve is maintained at the predetermined value (e.g. the degree of opening corresponding to the fully-opened state) on the basis of the estimated degree of opening. Therefore, it is possible to limit the fluctuation of the intake air amount, which is caused by that the detecting device falls into the failure state, as much as possible without excessively increasing a control load.

In another aspect of the apparatus for controlling a vehicle of the present invention, the vehicle further has a seating part which is used for the seating by the abutment and whose installation position is associated with the degree of opening, and the limiting device controls a target intake control valve to be seated on the seating past by the abutment.

According to this aspect, the seating part is provided for the vehicle as one portion of the intake control valve or as a different body from the intake control valve, and it is used for the seating by the abutment in the intake control valve. The installation position of the seating part is associated with the degree of opening of the intake control valve. If it is judged that the detecting device is in the failure state, the degree of opening of the intake control valve can be detected by making the target intake control valve abut on the seating part. If the degree of opening of the intake control valve is found, it is possible to control the degree of opening to some extent advantageously, in comparison with a case where some guidelines are provided. Thus, the fluctuation of the intake air amount can be limited. Incidentally, the structure of the seating part, such as a physical, mechanical, mechanistic, or electrical structure, is not limited at all as long as the seating for clarifying the degree of opening is possible, regardless of whether the seating part is unified with or separated from the intake control valve.

In one aspect of the apparatus for controlling a vehicle of the present invention in which the seating is performed by the abutment, the limiting device controls the target intake control valve such that a state of being fixed in the seating part is maintained after the seating.

According to this aspect, the state that the target intake control valve abuts on the seating part is continued (the seating part and the target intake control valve may be disconnected to the extent that can be ignored in practice). Thus, it is possible to continue the state that the degree of opening of the target intake control valve is accurately recognized. Therefore, the fluctuation of the intake air amount is surely limited.

In another aspect of the apparatus for controlling a vehicle of the present invention in which the seating is performed by the abutment, it has a learning device for learning the degree of opening of the target intake control valve with respect to a predetermined control amount on the basis of the degree of opening corresponding to the installation position of the seating part, the limiting device controls the target intake control valve such that the degree of opening is a predetermined value by using the learnt degree of opening.

According to this aspect, the degree of opening with respect to the predetermined control amount (e.g. an electric current, voltage, electric power, or the like) which defines the drive state of the target intake control valve is leant by the learning device which can adopt forms of various computer systems, such as various processing units like ECU, various controllers, microcomputer apparatuses, and the like. In other words, a correspondence relation between the degree of opening and the control amount is recognized in real time and is updated as occasion demands. Therefore, it is possible to control the target intake control valve to the desired degree of opening without an influence of physical, mechanical, mechanistic, or electrical variations generated in the intake control valve or the like, and it is possible to preferably limit the fluctuation of the intake air amount.

The operation and other advantages of the present invention will become more apparent from the embodiments explained below.

Figure 1:
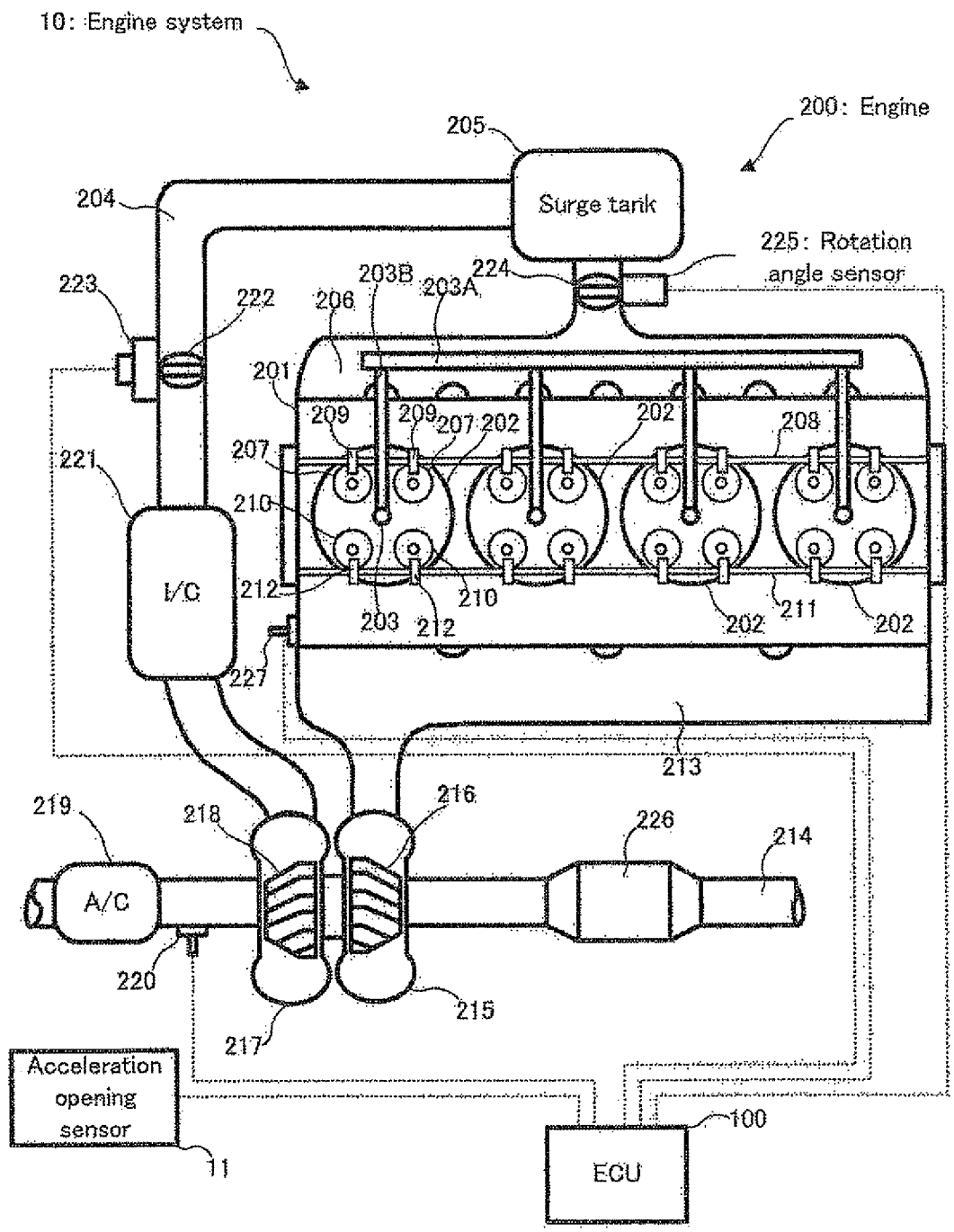
FIG. 1 is an outline structure diagram conceptually showing the structure of an engine system in a first embodiment of the present invention.

DESCRIPTION OF REFERENCE CODES 10 engine system
100 ECU
200 engine
202 cylinder
204 intake pipe
205 surge tank
206 communication pipe
207 intake valve
222 throttle valve
224 impulse valve
224A valve plug
224B rotating shaft
224C drive motor
224D drive circuit
225 rotation angle sensor
300 impulse valve
302 position detection device

BEST MODE FOR CARRYING OUT THE INVENTION

Embodiments of the Invention

Hereinafter, the preferred embodiments of the present invention will be explained with reference to the drawings.

First Embodiment

Structure of Embodiment

Firstly, with reference to FIG. 1, the structure of an engine system 10 in a first embodiment of the present invention will be explained. FIG. 1 is an outline structure diagram conceptually showing the structure of the engine system 10.

In FIG. 1, the engine system 10 is installed in a not-illustrated vehicle, and it is provided with an ECU 100 and an engine 200.

The ECU 100 is provided with a CPU (Central Processing Unit), a ROM (Read Only Memory), a RAM (Random Access Memory), or the like. The ECU 100 is an electronic control unit which can control all the operations of the engine 200, and it is one example of the "apparatus for controlling a vehicle" of the present invention. The ECU 100 is adapted to perform impulse valve control described later, in accordance with a control program stored in the ROM.

Incidentally, the ECU 100 is a unified electronic control unit which functions as the "judging device", the "limiting device", and the "change rate setting device" of the present invention; however, the physical, mechanical, mechanistic, and electrical structures of each of the devices are not limited to this, and they may be constructed as various computer systems, such as, for example, a plurality of ECUs, various processing units, and various controllers or micro computer apparatus.

The engine 200 is an inline four-cylinder diesel engine, which runs on light oil and which is one example of the "internal combustion engine" of the present invention. Explaining the outline of the engine 200, the engine 200 has such a structure that four cylinders 202 are disposed in parallel in a cylinder block 201. Moreover, in a compression stroke in each cylinder, an air-fuel mixture of fuel and suction air, which is directly injected into the cylinder in the compression stroke or intake stroke, is compressed, and a force generated in spontaneous ignition is converted to a rotary motion of a crankshaft (not illustrated) through a piston and a connecting rod which are not illustrated. The rotation of the crankshaft is transmitted to the driving wheels of the vehicle equipped with the engine system 10, thereby allowing the vehicle to travel. Hereinafter, the structure of the main part of the engine 200 will be explained with one portion of its operations. Incidentally, the structures of the individual cylinders are equal to each other, so that only one cylinder 202 will be explained here. If each cylinder is distinctly expressed, each of the four cylinders is expressed as respective one of a "first cylinder", a "second cylinder", a "third cylinder", and a "fourth cylinder".

In FIG. 1, the suction air, which is an air brought from the outside world, is supplied to a surge tank 205 through an intake pipe 204, wherein the inside of the surge tank 205 is connected to the intake pipe 204. The surge tank 205 is an accumulating device for stably supplying the suction air to the cylinder 202 side. The suction air brought into the intake pipe 204 is temporarily accumulated in the surge tank 205, thereby limiting its irregular pulsation or the like. Since the suction air is supplied to the cylinder 202 side with it pulsating to a greater or lesser, the suction air passing through the surge tank 205 is also a kind of pulsating wave.

On the downstream side of the surge tank 205 (i.e. the cylinder 202 side in this case), the intake pipe 204 is connected to a communication pipe 206, and the inside of the intake pipe 204 is connected to the communication pipe 206. The communication pipe 206 is connected to each of the intake ports (not illustrated) of each cylinder 202, and the suction air brought into the intake pipe 204 is brought into the intake ports corresponding to each cylinder through the communication pipe 206. One cylinder 202 is provided with two intake ports, and each of the two intake ports can be connected to the inside of the cylinder 202. The communication state between the intake port and the inside of the cylinder 202 is controlled by an intake valve 207 provided for each intake port. The opening/closing property of the intake valve 207 is defined in accordance with the cam profile (simply put, shape) of an intake cam 209, which is fixed to an intake cam shaft 208 for rotating in conjunction with the crankshaft and which has an oval cross section perpendicular to the extending direction of the intake cam shaft 208, and the intake valve 207 is constructed such that the intake port and the inside of the cylinder 202 can be connected in the valve opening. As described above, in the engine 200, the communication pipe 206 is aggregated on the upstream side of portions corresponding to the individual cylinders 202 (more specifically, the intake ports) and is connected to the surge tank 205. The communication pipe 206 is one example of the "path of intake air" in the present invention. Moreover, the intake system of the engine 200 is constructed as a so-called intake manifold less system (or intake system without an intake manifold) in which the communication pipe 206 is branched into the cylinders on the downstream side of the surge tank 205, as described above. However, the internal combustion engine of the present invention may be constructed such that the intake manifolds, which are independent of each other, are connected to the surge tank 205 and that the suction air is brought into the respective cylinders through the individual intake manifolds.

Inside the cylinder 202, a fuel injection valve as a part of an injector 203 of a cylinder-injection type is exposed, and light oil as fuel can be directly injected into the cylinders at high temperature and high pressure. Here, the fuel is accumulated in a not-illustrated fuel tank. The fuel accumulated in the fuel tank is pumped from the fuel tank by the action of not-illustrated feed pump and is pressure-fed to a not-illustrated high-pressure pump through a not-illustrated low-pressure pipe. The high-pressure pump can feed the fuel to a common rail 203A. Incidentally, the high-pressure pump can adopt the various known aspects, and the details will be omitted here.

The common rail 203A is a high-pressure accumulating device, which is electrically connected to the ECU 100 and which can accumulate the high-pressure fuel supplied from the upstream side (i.e. the high-pressure pump side) up to a target rail pressure set by the ECU 100. Incidentally, the common rail 203A is provided with a rail pressure sensor, which can detect a rail pressure; a pressure limiter, which restricts an accumulated fuel amount such that the rail pressure does not exceed an upper limit value, and the like, and the illustration thereof will be omitted here. The injector 203 is installed in each of the cylinders 202, and each injector 203 is connected to the common rail 203A through a high-pressure delivery 203B.

Here, the structure of the injector 203 will be added. The injector 203 is provided with an electromagnetic valve, which is activated on the basis of a command supplied from the ECU 100; and a nozzle for injecting the fuel upon the application of current to the electromagnetic valve (both of which are not illustrated). The electromagnetic valve can control a communication state between a pressure chamber for applying the high-pressure fuel of the common rail 203A and a low-pressure path on the low-pressures side connected to the pressure chamber. The electromagnetic valve provides the communication between the pressure chamber and the low-pressure path upon the application of current, and it blocks the communication between the pressure chamber and the low-pressure path in stopping the application of current.

On the other hand, the nozzle has a built-in needle, which opens and closes an injection hole, and the fuel pressure in the pressure chamber biases the needle in a direction of opening the valve (a direction of closing the injection hole). Therefore, if the pressure chamber and the low-pressure path are connected by the application of current to the electromagnetic valve to reduce the fuel pressure in the pressure chamber, the needle moves upward in the nozzle to open the valve (to open the injection hole), thereby injecting the high-pressure fuel supplied by the common rail 203A from the injection hole. Moreover, if the communication between the pressure chamber and the low-pressure path is blocked by stopping the application of current to the electromagnetic valve to increase the fuel pressure in the pressure chamber, the needle moves downward in the nozzle to close the valve, thereby ending the injection. Incidentally, such a structure is one example. For example, the fuel injection process itself may be electronically controlled (i.e. the fuel is injected without through the medium of pressure).

Here, according to the injector 203, it can finely control the injection amount of the fuel, and in the engine 200, the fuel corresponding to a target injection amount is injected, with the fuel divided into one or a plurality of times of pilot injection for promoting the premix of the fuel and the intake air (which, of course, is also to prevent a rapid increase in temperature in the combustion chamber) and into main injection corresponding to a difference between the target injection amount and the pilot injection amount, through the injector 203 in the individual cylinder 202.

Incidentally, the high-pressure pump, the common rail 203A, the high-pressure delivery 203B, and the injector 203 may be constructed as a unified common rail system. Moreover, the aspect for injecting the fuel into the cylinder at high temperature and high pressure is not limited to the aspect exemplified here, and the various known aspects may be adopted.

In any cases, the air-fuel mixture formed inside the cylinders 202 is spontaneously ignited and burnt in the compression stroke, and it is brought into an exhaust manifold 213 as exhaust air, such as a burnt gas or a partially unburnt air-fuel mixture, through not-illustrated exhaust ports, in the opening of exhaust valves 210, which open and close in conjunction with the opening and closing of the intake valves 207. The opening/closing property of the exhaust valve 210 is defined in accordance with the earn profile (simply put, shape) of an exhaust cam 212, which is fixed to an exhaust cam shaft 211 for rotating in conjunction with the crankshaft and which has an oval cross section perpendicular to the extending direction of the exhaust cam shaft 211, and the exhaust valve 210 is constructed such that the exhaust port and the inside of the cylinder 202 can be connected in the valve opening. The exhaust air aggregated in the exhaust manifold 213 is supplied to an exhaust pipe 214, which is connected to the exhaust manifold 213.

In the exhaust pipe 214, a turbine 216 is disposed in a form of being accommodated or housed in a turbine housing 215. The turbine 216 is a ceramic rotary impeller, which can rotate around a predetermined rotating shaft due to the pressure of the exhaust air brought into the exhaust pipe 214 (i.e. exhaust pressure). The rotating shaft of the turbine 216 is shared by a compressor 218 disposed in the intake pipe 204 in a form of being accommodated or housed in a compressor housing 217. When the turbine 216 rotates due to the exhaust pressure, the compressor 218 also rotates around the rotating shaft.

The compressor 218 can pressure-feed the suction air, which is sucked into the intake pipe 204 from the outside world through an air cleaner 219, to the aforementioned surge tank 205 by using the pressure associated with the rotation, and the pressure-feeding effect of the suction air by the compressor 218 realizes so-called supercharging. In other words, in the engine 200, the turbine 216 and the compressor 218 constitute a type of turbocharger.

Between the air cleaner 219 and the compressor 218, there is disposed a hot-wire airflow meter 220 which can detect the mass flow of the suction air. The airflow meter 220 is electrically connected to the ECU 100, and a detected suction air amount Ga is recognized by the ECU 100 with a constant or irregular period. Incidentally, in the embodiment, the detected suction air amount Ga has a unique relation with the amount of intake air sucked into the cylinders 202 (i.e. intake air amount), and it is treated as an index value which defines the actual load of the engine 200.

Between the compressor 218 and the surge tank 205, there is disposed an intercooler 221, and the supercharging efficiency is improved by cooling the supercharged suction air. Moreover, between the intercooler 221 and the surge tank 205, there is disposed a diesel throttle valve 222 which can adjust the amount of the suction air supplied to the surge tank 205. The diesel throttle valve 222 is a rotary valve which can be rotated by a drive force supplied from a throttle valve motor 223, which is electrically connected to the ECU 100 and which is controlled by the ECU 100, and its rotational position is continuously controlled from a fully-closed position to a fully-opened position, wherein the communication between the upstream portion and the downstream portion of the intake pipe 204 which border on the diesel throttle valve 222 is almost blocked at the fully-closed position, and the upstream portion and the downstream are almost entirely connected at the fully-opened position. As described above, in the engine 200, the diesel throttle valve 222 and the throttle valve motor 223 constitute a type of electronically-controlled throttle apparatus.

Incidentally, the engine 200 is a diesel engine, and its output is controlled through the increase and decrease control of the injection amount, as opposed to air-fuel control (fuel injection control based on the intake air amount) in the engine which runs on gasoline or the like. Therefore, with regard to the amount of the suction air sucked through the diesel throttle valve 222, there is no practical limit at least on the upper limit side, and the diesel throttle valve 222 is basically controlled to the fully-opened position in most parts of the operation period of the engine 200.

The request load of the engine 200 is determined in accordance with an accelerator opening Acc, as the operation amount of a not-illustrated accelerator pedal (i.e. the operation amount by a driver). The accelerator opening Acc is detected by an accelerator opening sensor 11 and is recognized with a constant or irregular period by the ECU 100, which is electrically connected to the accelerator opening sensor 11. On the whole, as the accelerator opening decreases, the request load decreases, and as the accelerator opening increases, the request load increases. The magnitude of the request load correlates with the magnitude of request output, so that the engine request output changes in accordance with the accelerator opening Acc in the engine system 10.

On the other hand, a single impulse valve 224 is disposed in the aggregation portion of the communication pipe 206 which connects the surge tank 205 and the intake valves 207 (i.e. the portion on the upstream side (on the surge tank 205 side) of the branch portion in which the communication pipe 206 is divided into the individual cylinders 202). The impulse valve 224 is an electromagnetic control valve, which is constructed such that the degree of opening defined in accordance with the position of a valve plug 224A, described later, continuously changes between a fully-closed opening which blocks the communication between the surge tank 205 and the communication pipe 206 (hereinafter referred to as "0% opening" as occasion demands) and a fully-opened opening which provides the communication between the surge tank 205 and the communication pipe 206 almost entirely (hereinafter referred to as "100% opening" as occasion demands) and which is one example of the "intake control valve" of the present invention.

Figure 2:
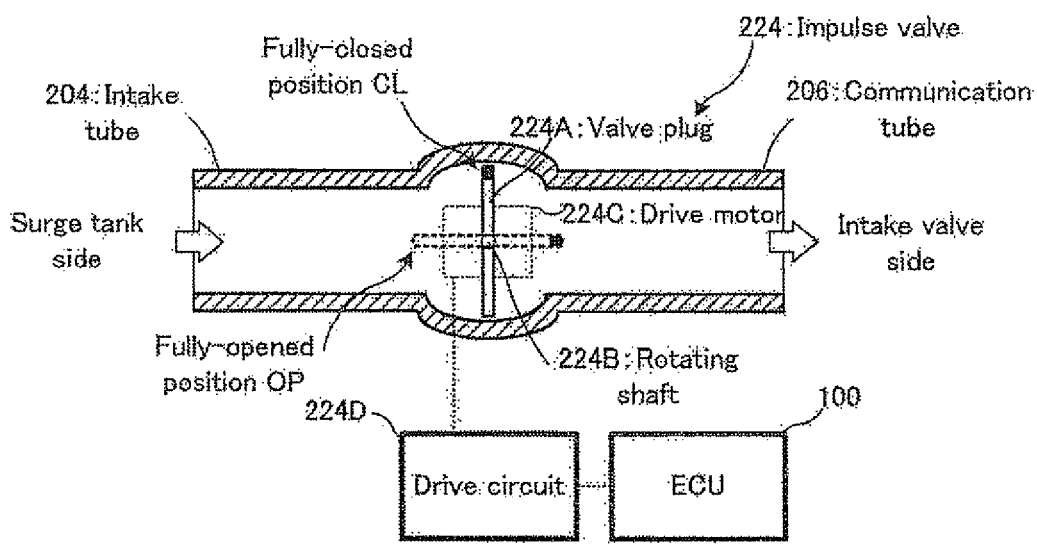
FIG. 2 is a schematic cross sectional view showing the periphery of an impulse valve in the engine system in FIG. 1.

Now, with reference to FIG. 2, the details of the impulse valve 224 will be explained. FIG. 2 is a schematic cross sectional view showing the periphery of the impulse valve 224. Incidentally, in FIG. 2, the overlaps with those in FIG. 1 will carry the same referential numerals, and the explanation thereof will be omitted, as occasion demands.

In FIG. 2, the impulse valve 224 is constructed as a valve apparatus provided with a valve plug 224A, a rotation shaft 224B, a drive motor 224C, and a drive circuit 224D.

The valve plug 224A is a rotating body which can rotate in a plane in the illustrated cross section.

The rotating shaft 224B is a shaft body which defines the center of rotation of the valve plug 224A and is joined to the rotating shaft of the drive motor 224C.

The drive motor 224C is a three-phase AC (alternating current) electric motor, and the aforementioned rotating shaft 224B is joined to the rotating shaft of the drive motor 224C. In the drive motor 224C, a not-illustrated rotor, which is joined to the rotating shaft and which includes a permanent magnet, is rotated by the action of a magnetic field formed in the drive motor 224C by the drive circuit 224D, thereby generating a drive force in the rotational direction of the rotor.

The drive circuit 224D is a power control circuit which can control the state of the magnetic field formed in the drive motor 224C. The drive circuit 224D is electrically connected to the ECU 100, and its operation is controlled by the ECU 100.

Here, the position of the valve plug 224A which defines the degree of opening of the impulse valve 224 is controlled continuously (or step by step to the extent that it can be regarded as continuously in practice) between an illustrated fully-closed position CL and an illustrated fully-opened position OP in a normal situation. The fully-closed position CL is a position corresponding to the aforementioned fully-closed opening (0% opening), and the fully-opened position OP is a position corresponding to the aforementioned fully-opened opening (100% opening). Additionally, it is assumed that the reference position of the valve plug 224A of the impulse valve 224 in the normal situation (i.e. a position in non-driving and a default position) is the fully-closed position and that its corresponding opening angle is 0 degrees. The valve plug 224A is continuously position-controlled from the reference position to an opening angle of 90 degrees (i.e. corresponding to the fully-opened position) in a clockwise direction.

The ECU 100 controls the drive circuit 224D such that the valve plug 224A stops at a target position (target opening angle) corresponding to the target opening of the impulse valve 224. As a result, in response to electric supply from the drive circuit 224D, the magnetic field for rotating the rotor of the drive motor 224C to a position corresponding to the target position or for keeping the rotor at the position corresponding to the target position is formed in the drive motor 224C, and the valve plug 224A indirectly fixed to the rotor eventually stops at the target position. Incidentally, in the control range of the opening angle described above, the valve plug 224A can also rotate in both the clockwise direction and a counterclockwise direction. As described above, in the engine 200, the impulse valve 224 is provided on the downstream side of the diesel throttle valve 222, so that the supply of the suction air to each cylinder 202 is controlled in accordance with the opening/closing state of the impulse valve 224.

Back in FIG. 1, the impulse valve 224 can adopt such a continuously variable opening/closing state, so that it is possible to supply the suction air supplied from the surge tank 205, to the communication pipe 206 with the suction air pulsating, by repeating the binary opening/closing operation or the like. As described above, considering that the suction air is an element which constitutes the intake air and that the suction air can be supplied as the pulsating wave, the intake air is also sucked into the cylinders 202 as the pulsating wave. Incidentally, the operation of the impulse valve 224 for making the intake air pulsate is not limited to the repetition of the opening/closing operation. For example, if the pressure is different between the upstream and downstream of the impulse valve 224, then, the pulsation of the intake air is preferably generated even by one opening/closing operation.

In the vicinity of the impulse valve 224 in the communication pipe 206, a rotation angle sensor 225 is disposed. The rotation angle sensor 225 is a so-called resolver, which can detect an angle by using a change in the phase of a voltage outputted from the two-phase coil of the rotor, and the rotation angle sensor 225 can detect the degree of opening of the impulse valve 224 (i.e. uniquely, the position of the valve plug 224A). Moreover, the rotation angle sensor 225 is electrically connected to the ECU 100, and the detected degree of opening of the impulse valve 224 is recognized by the ECU 100 with a constant or irregular period. Incidentally, the device for detecting the degree of opening of the impulse valve 224 is not limited to the resolver.

In the exhaust pipe 214, a DPF (Diesel Particular Filter 226) is disposed. The DPF 226 can collect and purify PMs (Particulate Matters) emitted from the engine 200. Moreover, in the cylinder block 201 for accommodating the cylinders 202, a water temperature sensor 227 is disposed. Inside the cylinder block 201, a water jacket, which is a cooling water flow path for cooling the cylinders 202, is formed like a network, and LLC as cooling water is circulated by the action of a not-illustrated circulation system inside the water jacket. In the water temperature sensor 227, one portion of a detection terminal is exposed inside the water jacket, so that it is possible to detect the temperature of the cooling water. The water temperature sensor 227 is electrically connected to the ECU 100, and the detected codling water temperature is recognized by the ECU 100 with a constant or irregular period.

Incidentally, in the engine system 10 in the embodiment, the engine 200 as the diesel engine is adopted as one example of the "internal combustion engine" of the present invention; however, the internal combustion engine of the present invention does not indicate only the diesel engine, and of course, it may be a gasoline engine, an engine which uses alcohol blended fuel, and the like. Moreover, in order to prevent complicated explanation, the engine 200 in the embodiment is not equipped with an exhaust gas re-circulating apparatus, such as EGR; however, of course, the engine 200 may be equipped with the exhaust gas re-circulating apparatus as a preferable aspect. Here, in view of the structure that the exhaust gas re-circulating apparatus is not equipped, the intake air sucked into each cylinder 202 through the intake port is composed only of the suction air brought through the intake pipe 204, in the engine 200 in the embodiment.

Operations of Embodiment

Basic Operation of Impulse Charging

In the engine system 10, if an engine rotation speed NE of the engine 200 is in predetermined impulse charge area, impulse charging is performed. Here, the impulse charging indicates inertia supercharging using the pulsation of the intake air generated by the opening/closing of the impulse valve 224. More specifically, if the impulse valve 224 is opened in the valve opening period of the intake valve 207, the surge tank 205 is connected to the inside of the relevant cylinder 202 (i.e. the cylinder in the intake stroke at that time point), and the suction air flows into the cylinder 202 through the impulse valve 224 at a stroke. At this time, the intake air is the pulsating wave, and the intake air corresponding to the top or crest of the pulsation has the greater inertia in comparison with a case of natural aspiration. Thus, the subsequent intake air flows into the cylinder 202, like following the intake air which has the greater inertia. Therefore, at least by opening the impulse valve 224 in the valve opening period of the intake valve 207, it is possible to relatively increase the intake air amount and to improve the output of the engine 200. At this time, the degree of opening of the impulse valve 224 is continuously controlled between the fully-opened opening and the fully-closed opening as described above, and the target opening as the target value is set in accordance with the engine rotation speed NE and the request load or the request output, as occasion demands.

Incidentally, the engine 200 in the embodiment adopts a so-called intake manifold less system (or intake system without an intake manifold) of a one-valve type, and the impulse charging in all the four cylinders 202 is satisfied by the single impulse valve 224. Thus, at least in the engine 200, the impulse valve 224 is closed during the intake stroke of one cylinder 202 to prepare for the intake stroke for the next cylinder. On the other hand, a time required for the opening/closing of the impulse valve 224 has a minimum value, which can be determined in the physical, mechanical, mechanistic, or electrical structure of the impulse valve 224 although the impulse valve 224 is constructed as an electromagnetic valve having a relatively high response speed. If the valve opening period of the intake valve 207 is shorter than a drive time corresponding to the minimum value, it is impossible to follow the operations of the intake valve 207, which is continuously opened and closed. The valve opening period of the intake valve 207 is uniquely determined if the valve opening period and a valve closing period are fixed, i.e. in accordance with the engine rotation speed NE. Moreover, even if at least one of the valve opening period and the valve closing period or a valve lift amount is variable due to VVT (Variable Valve Timing) of the like, the valve opening period of the intake valve 207 changes in accordance with the engine rotation speed NE. The aforementioned impulse charge area is an area of the engine rotation speed NE in which the impulse changing can be performed at least to the extent that it does not fail in practice (preferably, it can be performed on all the cylinders), and the impulse charge area is determined on the basis of whether or not the value of the engine rotation speed NE is less than or equal to the engine rotation speed that defined the upper limit of the area. Incidentally, this is merely one example, and the impulse charge area may be defined more complicatedly. For example, in a light-load area such as in steady travel, the required intake air amount is less, and in practice, the suction air amount is considerably narrowed or reduced by the diesel throttle valve 222. In such an intake air narrowing area, the impulse charging is not required from the beginning in most cases. For example, if it is judged that the request load corresponds to the light load to the extent that the utility of the impulse charging can be denied, then, the impulse charging may not be performed. Moreover, in the embodiment, the impulse charging, which uses the impulse valve 224 and which is performed in the impulse charge area, is expressed as "normal drive of the impulse valve 224" or the like, as occasion demands.

<Details of Impulse Valve Drive Control>

In the impulse valve 224, as described above, the valve plug 224A is driven by the drive motor 224C and the drive circuit 224D, and the degree of opening is controlled to the aforementioned target opening. Here, the degree of opening of the impulse valve 224 is detected by the rotation angle sensor 225. Thus, in order to perform the aforementioned impulse charging, basically, the rotation angle sensor 225 needs to be in the normal situation. If the rotation angle sensor 225 is not in the normal situation, it is hard to detect the actual degree of opening of the impulse valve 224 at least in real time and with accuracy, and it is hard to significantly drive the impulse valve 224. Driving the impulse valve 224 without any guideline in the situation that the degree of opening is unknown is not practically different from not driving the impulse valve 224 at least in the effect, and it likely causes wasteful use of electric power resources or reduction in lifetime of the impulse valve 224. Thus, it can be said that it has a disadvantage.

On the other hand, the reference position of the impulse valve 224 enables the impulse charging to be efficiently performed, so that it is set to the fully-closed position as described above, and the communication between the surge tank 205 and the intake valve 207 is blocked in the non-driving. Therefore, if the drive of the impulse valve 224 is stopped when the rotation angle sensor 225 is not in the normal situation, the operations (operations associated with combustion) of such cylinders 202 that the opening/closing of the impulse valve 224 corresponding to the rotation angle sensor 225 that is not in the normal situation (i.e. one example of the "target intake control valve" of the present invention) can influence on the magnitude of the intake air amount are substantially stopped, wherein the cylinders 202 are namely one example of the "target cylinder" of the present invention, and they are all the first to fourth cylinders in the embodiment because the single impulse control valve 224 satisfies all the cylinders. Incidentally, in the following explanation, such a cylinder is referred to as a "target cylinder, as occasion demands. As a result, the output of the engine 200 is not a little reduced, which actualizes output fluctuation. Moreover, the output fluctuation is a factor for rotational fluctuation, which is the fluctuation of the engine rotation speed. Particularly, in the embodiment, the intake manifold less system (or intake system without an intake manifold) of a one-valve type is adopted as the intake system, and the target intake control valve is the single impulse valve 224, and the target cylinder corresponds to all the cylinders provided for the engine 200. Therefore, if no measures are taken, the failure of the rotation angle sensor 225 causes the engine 200 to be stopped even if the impulse valve 224 is normal. Thus, in order to dissolve such a problem, impulse valve drive control is performed by the ECU 100.

Figure 3:
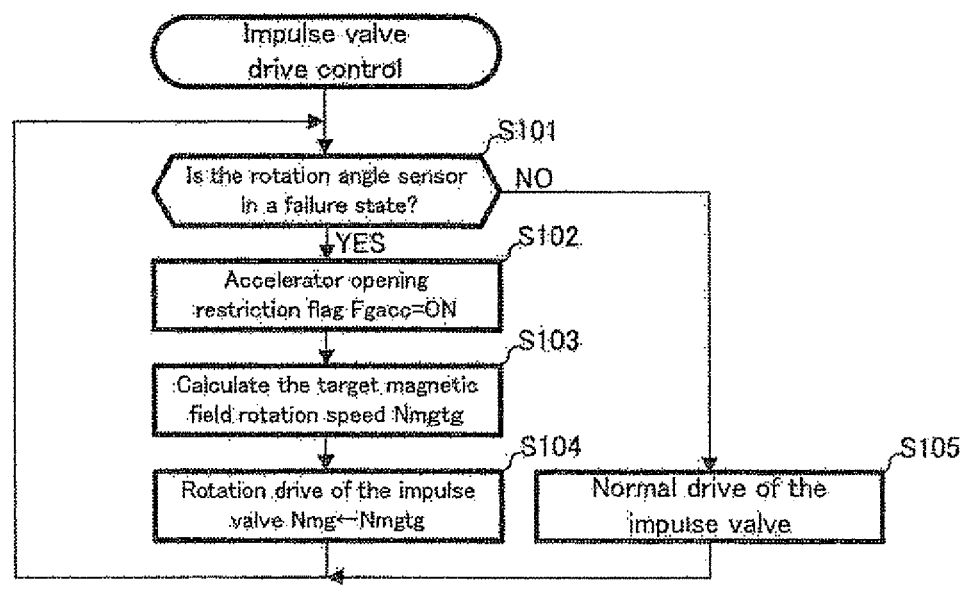
FIG. 3 is a flowchart showing impulse valve drive control performed in the engine system in FIG. 1.

Now, with reference to FIG. 3, the details of the impulse valve drive control will be explained. FIG. 3 is a flowchart showing the impulse valve drive control.

In FIG. 3, firstly, it is judged whether or not the rotation angle sensor 225 is in a failure state (step S101). Whether or not the rotation angle sensor 225 is in the failure state can be easily judged from whether or not an electric signal outputted from the rotation angle sensor 225 is abnormal. The abnormality of the electric signal also includes a case where an electric path between the rotation angle sensor 225 and the ECU 100 is broken or disconnected. The possible range (i.e. normal value) of the electric signal from the rotation angle sensor 225 is defined on the basis of experiments, experiences, theories, simulations, or the like in advance. For an output signal that does not have the normal value, the ECU 100 judges that the rotation angle sensor 225 is in an abnormal situation.

If the rotation angle sensor 225 is not in the failure state (the step S101: NO), the aforementioned normal drive of the impulse valve 224 is performed (step S105). If the normal drive of the impulse valve 224 is performed, the process is returned to the step S101, and the series of processes is repeated. On the other hand, if the rotation angle sensor 225 is in the failure state (the step S101: YES), an accelerator opening restriction flag Fgacc is controlled to be in an ON state, which indicates that the accelerator opening Acc is to be controlled on the upper limit side (step S102). If the accelerator opening restriction flag Fgacc is in the ON state, restrictions by the upper limit value are imposed on the accelerator opening Acc detected by the accelerator opening sensor 11, and all the values that are greater than or equal to the upper limit value are treated as the upper limit value. Incidentally, the accelerator pedal is one example of the "operating device" of the present invention. The accelerator opening Acc is one example of the "operation amount" of the present invention, and it is an index value which defines the request output of the engine 200. The benefit obtained by restricting the accelerator opening Acc will be described later.

If the accelerator opening Acc is restricted, the ECU 100 calculates a target magnetic field rotation speed Nmgtg, which is the target value of the rotation speed of the rotating magnetic field formed in the drive motor by rotationally driving the valve plug 224A of the impulse control valve 224 (step S103). If the target magnetic field rotation speed Nmgtg is determined, the ECU 100 controls the drive circuit 224 such that the magnetic field rotation speed Nmg, which is the rotation speed of the rotating magnetic field, is the calculated target magnetic field rotation speed Nmgtg (step S104). As a result, the valve plug 224A of the impulse valve 324 rotates at substantially the same rotation speed as the target magnetic field rotation speed Nmgtg. If the impulse valve 224 is rotationally driven, the process is returned to the step S101, and the series of processes is repeated.

Here, in the normal situation that the rotation angle sensor 225 is judged not to be in the failure state, the opening angle of the valve plug 224A is controlled in the range of 0 degrees (i.e. corresponding to the fully-closed opening) to 90 degrees (i.e. corresponding to the fully-opened opening) as described above, and the normal drive of the impulse valve 224 described above is realized. However, if the rotation angle sensor 225 is in the failure state, reliability for the detected degree of opening is ensured (conversely, such a state that reliability is not ensured corresponds to the failure state), so that it is impossible to perform the normal drive. Therefore, if the control according to the embodiment is not performed, the drive of the impulse valve 224 is stopped as described above, and the position of the valve plug 224A is controlled to the reference position corresponding to the opening angle of 0 degrees.

On the other hand, according to the embodiment, the rotating magnetic field is formed in the drive motor 224C, and the rotor including the permanent magnet is rotationally driven by the rotating magnetic field, by which the valve plug 224A is rotated in a certain direction (e.g. the clockwise direction in FIG. 2) inside the communication pipe 206. As described above, if the valve plug 224A is rotationally driven in the constant direction, then, as viewed from a proper time range, the degree of opening of the impulse valve 224 adopts a value which is at least not the fully-closed opening. Therefore, even if the actual degree of opening of the impulse valve 224 (or the substantial degree of opening obtained by rotationally driving the valve plug 224A) is unknown, the intake air amount in the target cylinder increases at least to some extent, in comparison with the case where the valve plug 224A stops at the fully-closed position. In other words, by continuously changing the degree of opening of the impulse valve 224, one example of "controlling a target intake control valve such that at least it is not fixed in a fully-closed state which blocks a supply of the intake air to the target cylinder" in the present invention is realized. As a result, the fluctuation of the intake air amount, which corresponds to a deviation between the intake air amount in the case where the rotation angle sensor 225 is in the failure state and the intake air amount obtained in the normal situation in which the rotation angle sensor 225 is not in the failure state, is limited, so that the output fluctuation and rotational fluctuation of the engine 200 are limited.

Moreover, in the process in the step S103, the target magnetic field rotation speed Nmgtg is determined as the value according to the engine rotation speed NE of the engine 200. In the engine 200, an absolute time required for the intake stroke changes in accordance with the engine rotation speed NE. Therefore, in a high-rotation area in which the absolute time is short, there is a possibility that the intake air amount of the target cylinder is not sufficiently ensured if the target cylinder enters the intake stroke when the valve plug 224A is near the fully-closed position even if the valve plug 224A is rotationally driven. Moreover, as described above, if the target magnetic field rotation speed Nmgtg is clearly lower than the engine rotation speed NE, the deviation, which is hardly ignored in practice, likely occurs in the intake air amount in the individual target cylinders (i.e. the first to fourth cylinders), which continuously enter the intake stroke.

Thus, in the process in the step S103, as a general tendency, the target magnetic field rotation speed Nmgtg is determined to be higher as the engine rotation speed NE increases. At this time, the target magnetic field rotation speed is Nmgtg is obtained by selectively obtaining relevant one value from a target magnetic field rotation speed map stored in the ROM of the ECU 100 (such an aspect shall be also one aspect of the "calculation"). The target magnetic field rotation speed map is determined to obtain the target magnetic field rotation speed Nmgtg, which can limit the physical, mechanical, mechanistic, or electrical deterioration of the motor 224C as much as possible, in a range that does not allow the fluctuation of the intake air amount among the target cylinders, on the basis of experiments, experiences, theories, simulations or the like in advance.

Here, particularly in the embodiment, the accelerator opening Acc is restricted by the process in the step S102. The accelerator opening Acc correlates with the request output of the engine 200 (incidentally, the "request output" of the present invention may be, of course, request torque). More specifically, the request output of the engine 200 is determined on the basis of the engine rotation speed and the accelerator opening Acc (e.g. as a preferable aspect, each of the magnitude of the engine rotation speed NE and the magnitude of the accelerator opening Acc corresponds to the magnitude of the request output). At this time, the ECU 100 refers to a request output map stored in the ROM in advance, and basically, the ECU 100 selectively obtains one value that meets the engine rotation speed NE and the accelerator opening Acc at that time point as the request output. If the request output is determined, then, basically, the fuel injection amount according to the request output is selectively obtained from an injection amount map, and it is determined as the fuel injection amount to be injected from the injector 203.

On the other hand, the engine 200 is a diesel engine, and the upper limit value of the fuel injection amount is uniquely determined in accordance with the intake air amount (or suction air amount) at that time point. If the determined fuel injection amount is greater than the upper limit value, then, the fuel injection amount is controlled by the upper limit value, and the target supercharging pressure of the turbocharger increases in order to further increase the intake air amount. The rotation drive of the impulse valve 224 limits the fluctuation of the intake air amount; however, of course, such measures are to perform the evacuation travel of a vehicle, and it is hard to make the intake air amount reach to the target value. In such circumstances, if no restrictions are imposed on the request output, the fluctuation of the intake air amount with respect to its proper value will further increase in a case where the target supercharging pressure is set higher. In other words, in the embodiment, the fluctuation of the intake air amount, which highly likely occurs in the near future, is limited predicatively by imposing the restrictions on the accelerator opening. Moreover, in the embodiment, the suction air amount is detected by the airflow meter 220, and the intake air amount of each of the cylinders 202 can be calculated on the basis of the detected suction air amount. In an engine that is not provided with such a suction air amount detecting device, the yield of smoke likely increases if no restrictions are imposed on the accelerator opening. In other words, from the viewpoint of limiting the deterioration in emission, it is effective to restrict the accelerator opening.

Incidentally, in the embodiment, the reference position of the valve plug 224A of the impulse valve 224 is the fully-closed position; however, it is merely one example, and for example, the reference position of the valve plug 224A may be set to the fully-opened position corresponding to the opening angle of 90 degrees. In this case, if it is judged that the rotation angle sensor 225 is in the failure state, the intake air amount of the target cylinder is ideally to be ensured when the impulse valve 224 is not driven, and the fluctuation of the intake air amount can be extremely small at a glance. However, at the time point of the judgment that the rotation angle sensor 225 is in the failure state, the actual degree of opening of the impulse valve 224 is unknown, and it is unclear whether the valve plug 224A is really at the reference position, regardless of which position the reference position is set to. Therefore, even if the impulse valve 224 is simply not driven, the intake air amount cannot be surely ensured, and even if it can, it is merely an accidental result. On the other hand, it is obvious that the significant degree of opening, which is at least not zero, is obtained by rotationally driving the valve ping 224A at the set rotation speed, wherein the fact that regardless of the rotation drive, the valve plug 224A does not rotate is caused by the failure of the impulse valve 224, and it is a separate problem. Moreover, in terms of consideration to safety, such as at least not stopping the operations of the target cylinder, the rotation drive of the valve plug 224A in the embodiment is clearly beneficial.

Second Embodiment

Figure 4:
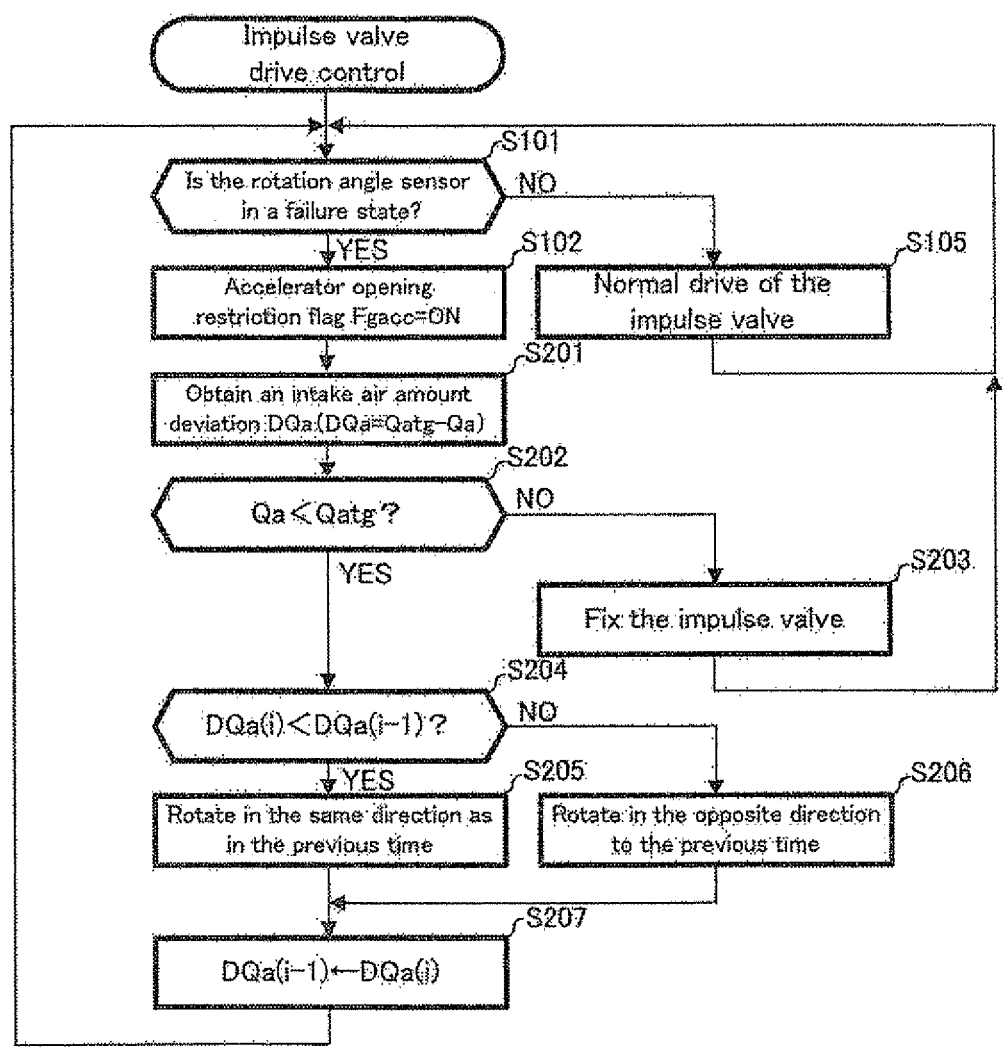
FIG. 4 is a flowchart showing impulse valve drive control in a second embodiment of the present invention.

Next, with reference to FIG. 4, an explanation will be given on impulse valve drive control in a second embodiment of the present invention. FIG. 4 is a flowchart showing the impulse valve drive control in the second embodiment. Incidentally, in FIG. 4, the overlaps with those in FIG. 3 will carry the same referential numerals, and the explanation thereof will be omitted, as occasion demands. Moreover, the structure of an engine system in the second embodiment is equal to that of the engine system 10 in the first embodiment.

In FIG. 4, firstly, it is judged whether or not the rotation angle sensor 225 is in a failure state (step S101). Whether or not the rotation angle sensor 225 is in the failure state can be easily judged from whether or not an electric signal out putted from the rotation angle sensor 225 is abnormal. The abnormality of the electric signal also includes a case where an electric path between the rotation angle sensor 225 and the ECU 100 is broken or disconnected. The possible range (i.e. normal value) of the electric signal from the rotation angle sensor 225 is defined on the basis of experiments, experiences, theories, simulations, or the like in advance. For an output signal that does not have the normal value, the ECU 100 judges that the rotation angle sensor 225 is in an abnormal situation.

If the rotation angle sensor 225 is not in the failure state (the step S101: NO), the aforementioned normal drive of the impulse valve 224 is performed (step S105). If the normal drive of the impulse valve 224 is performed, the process is returned to the step S101, and the series of processes is repeated. On the other hand, if the rotation angle sensor 225 is in the failure state (the step S101: YES), an accelerator opening restriction flag Fgacc is controlled to be in an ON state, which indicates that the accelerator opening Acc is to be controlled on the upper limit side (step S102). If the accelerator opening restriction flag Fgacc is in the ON state, restrictions by the upper limit value are imposed on the accelerator opening Acc detected by the accelerator opening sensor 11, and all the values that are greater than or equal to the upper limit value are treated as the upper limit value. Incidentally, the accelerator pedal is one example of the "operating device" of the present invention. The accelerator opening Acc is one example of the "operation amount" of the present invention, and it is an index value which defines the request output of the engine 200. The benefit obtained by restricting the accelerator opening Acc will be described later.

If the accelerator opening restriction flag Fgacc is controlled to be in the ON state and the accelerator opening Acc is restricted, the ECU 100 obtains an intake air amount deviation DQa of the target cylinder. Incidentally, the intake air amount deviation DQa can be treated as being equal in the first to fourth cylinders. The intake air amount deviation DQa is defined as a difference between a target intake air amount Qatg (i.e. one example of the "target value of the index value" of the present invention) and an actual intake air amount Qa (i.e. one example of the "predetermined index value defined as correlating with the intake air amount" of the present invention). At this time, the target intake air amount Qatg is mapped in association with the engine rotation speed NE and the accelerator opening Acc (i.e. load) in advance, and one value corresponding to the engine rotation speed NE and the accelerator opening Acc (already restricted) at that time point is selectively obtained. The actual intake air amount Qa is calculated on the basis of the suction air amount of the entire engine 20 detected by the airflow meter 220. In other words, in the embodiment, the ECU 100 is constructed to also function as one example of the "specifying device" and the "target value setting device" of the present invention.

If the intake air amount deviation DQa is obtained, it is judged whether or not the actual intake air amount Qa is less than the target intake air amount Qatg (step S202). If the actual intake air amount Qa is greater than or equal to the target intake air amount Qatg (the step S202: NO), the output fluctuation, which is a problem in practice, does not occur (i.e. since the output control based on the injection amount is performed in the engine 200, the excessive intake air amount does not cause the excessive output). Thus, the position of the valve plug 224A is fixed, and the degree of opening of the impulse valve 224 is maintained at the degree of opening (which is unknown as the value) at that time point (step S203).

On the other hand, if the actual intake air amount Qa is less than the target intake air amount Qatg (the step S202: YES), the ECU 100 judges whether or not the latest value DQa(i) (i.e. the value obtained in the process in the step S201) of the intake air amount deviation DQa is less than a previous value DQa(i-1) (step S204). Incidentally, in the present invention, "greater than or equal to" and "less than" can be easily conceptually replaced by "greater than" and "less than or equal to", respectively, according to aspects of setting the reference value.

Here, if the latest value DQa(i) is less than the previous value DQa(i-1) (the step S204: YES), the ECU 100 controls the drive circuit 224D such that the valve plug 224A of the impulse valve 224 rotates by a predetermined amount in the same direction as in the previous time (step S205). At this time, the control amount of the drive circuit 224D corresponding to the predetermined amount, which defines the amount of one rotation of the valve plug 224A (and which is, however, merely prediction due to the failure of the rotation angle sensor 225), can be appropriately set such that there is no excessive change in the intake air amount in one rotation operation and such that the intake air amount deviation DQa converges on the theoretical, substantial, or practical minimum value as quickly as possible on the basis of experiments, experiences theories, simulations, or the like in advance.

Incidentally, if the judgment process in the step S204 is performed for the first time, there is no previous value DQa(i-1) of the intake air amount deviation, so that an initial value set in advance is used. In the embodiment, the initial value is infinite, and after all, the first process in the step S204 is unconditionally branched to the "YES" side. Moreover, at this time, under the assumption that the valve plug 224A stands at the fully-closed position (which is actually unknown; however, it is appropriate to think so due to the reference position of the valve plug 224A), the rotational direction of the valve plug 224A is set to a direction of increasing the opening angle (in FIG. 1, the clockwise direction).

On the other hand, if the latest value DQa(i) is greater than or equal to the previous value DQa(i-1) (the step S204: NO), the ECU 100 controls the drive circuit 224D such that the valve plug 224A rotates by the aforementioned rotation amount in the opposite direction to the previous time (step S206). If the process in the step S205 or step S206 is performed, the previous value DQa(i-1) of the intake air amount deviation is updated to the latest value DQa (step S207). If the previous value is updated or if the degree of opening of the impulse valve 224 is maintained in the process in the step S203, the process is returned to the step S101, and the series of processes is repeated. As a result, even if the actual intake air amount Qa is less than the target intake air amount Qatg, the intake air amount deviation DQa is maintained at the minimum value, theoretically, substantially, or practically, and the output fluctuation and rotational fluctuation are preferably limited by limiting the fluctuation of the intake air amount in the target cylinder.

As described above, according to the impulse valve drive control in the embodiment, although the actual degree of opening of the impulse valve 224 is unknown, as long as the actual intake air amount Qa is less than the target intake air amount Qatg, the degree of opening of the impulse valve 224 is feedback-controlled such that the intake air amount deviation DQa is theoretically, substantially, or practically minimal, i.e. such that the actual intake air amount Qa converges on the target intake air amount Qatg. In other words, by using the intake air amount influenced by the degree of opening of the impulse valve 224 as the index value, the occurrence of the output fluctuation and the rotational fluctuation associated therewith is preferably limited.

Incidentally, here, the actual intake air amount Qa is used as the "predetermined index value defined as correlating with the intake air amount" of the present invention; however, it is one example, and for example, instead of the actual intake air amount Qa, an actual supercharging pressure, an in-cylinder pressure of the cylinder 202, a detection value of the airflow meter 220, or the like may be used. If a gasoline engine or the like with air-fuel ratio control performed is adopted as one example of the internal combustion engine of the present invention, then, an air-fuel ratio may be used as the index value.

Incidentally, even if such feedback control is performed, the convergence value changes in accordance with the step width of the control amount in the step S205 and the step S206. Therefore, if the convergence value (i.e. the minimum value of the intake air amount deviation, which can be realized with the step width of the current time point) is large enough to actualize some defects in practice, the step width may be further reduced, and fine convergence control may be performed. In other words, the step width may be a variable value.

Here, in particular, when the feedback control is performed, the restrictions on the accelerator opening Acc in the step S102 is effective. In other words, the accelerator opening Acc is restricted, by which the target intake air amount Qatg as a convergence target is practically restricted on the upper limit side. Therefore, the intake air amount deviation DQa does not increase (preferably, it reduces) in comparison with a case where no restrictions are imposed on the accelerator opening, and a time required to enable the actual intake air amount Qa to converge on the target intake air amount Qatg is relatively reduced. However, considering that the same effect as in the case of detecting the degree of opening can be practically obtained without through the detection of the degree of opening of the impulse valve 224 by making the proper index value (here, the actual intake air amount Qa) converge on the convergence target value (here, the target intake air amount Qatg), the effect that the fluctuation of the intake air amount is limited in the embodiment is sufficiently ensured without the restrictions imposed on the accelerator opening Acc.

Third Embodiment

Figure 5:
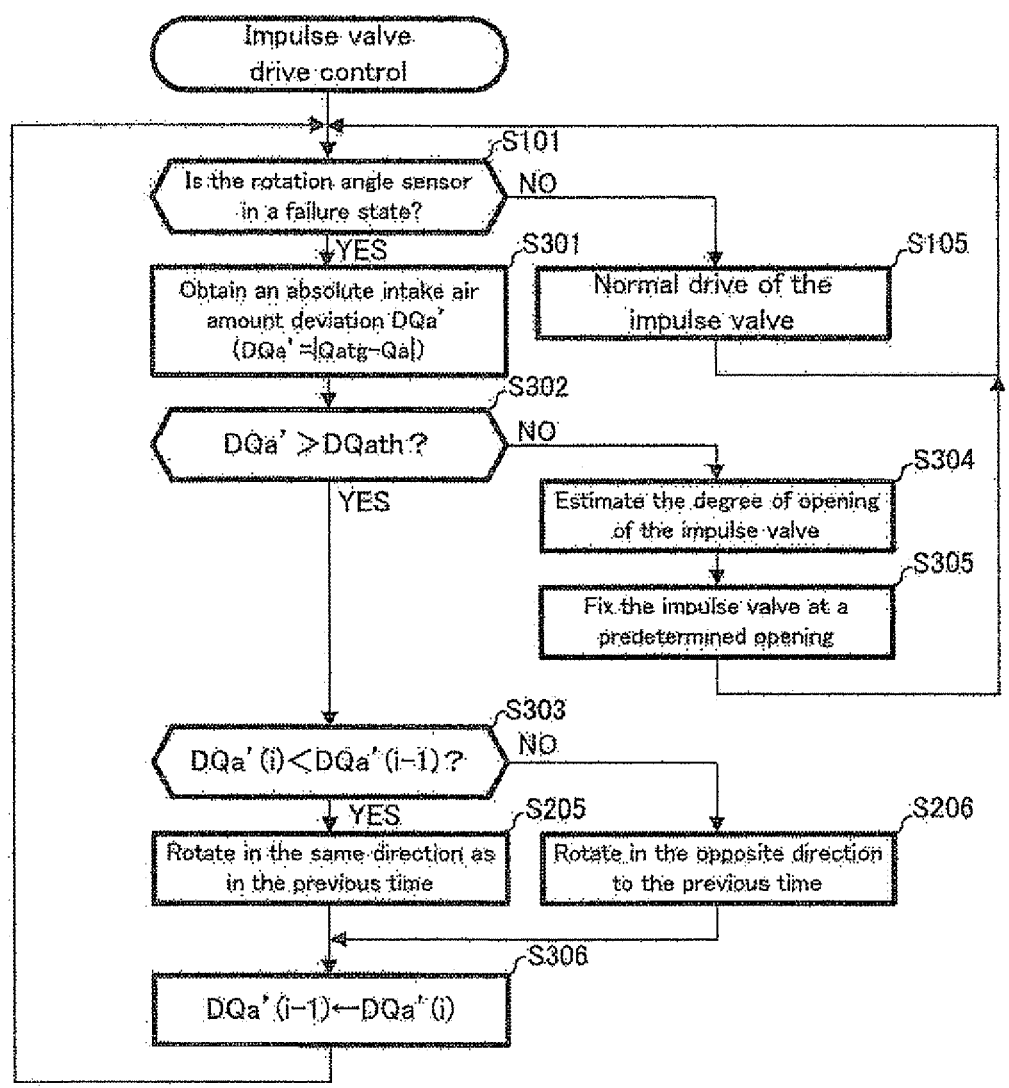
FIG. 5 is a flowchart showing impulse valve drive control in a third embodiment of the present invention.

Next, with reference to FIG. 5, an explanation will be given on impulse valve drive control in a third embodiment of the present invention. FIG. 5 is a flowchart showing the impulse valve drive control in the third embodiment of the present invention. Incidentally, in FIG. 5, the overlaps with those in FIG. 3 and FIG. 4 will carry the same referential numerals, and the explanation thereof will be omitted, as occasion demands. Moreover, the structure of an engine system in the third embodiment is equal to that of the engine system 10 in the first embodiment.

In FIG. 5, if the rotation angle sensor 225 is in the failure state, the ECU 100 obtains an absolute intake air amount, deviation DQa' (step S301). Here, the absolute intake air amount deviation DQa' is defined as the absolute value of a difference between the target intake air amount Qatg and the actual intake air amount Qa in the individual target cylinder.

If the absolute intake air amount deviation DQa' is obtained, the ECU 100 fudges whether or not the obtained absolute intake air amount deviation DQa' is greater than a judgment reference value DQath set in advance (step S302). Here, the value of the judgment reference value DQath is an appropriate value set on the basis of experiments, experiences, theories, simulations or the like in advance, and it is set as a value which at least ensures the accuracy of the estimation described later of the degree of opening of the impulse valve 224 without problems in practice.

If the obtained absolute intake air amount deviation DQa' is greater than the judgment reference value (the step S302: YES), the ECU 100 judges whether or not the latest value DQa'(i) (i.e. the value obtained in the process in the step S301) of the absolute intake air amount deviation DQa' is less than a previous value DQa' (i−1) (step S303). Incidentally, in the present invention, "greater than or equal to" and "less than" can be easily conceptually replaced by "greater than" and "less than or equal to", respectively, according to aspects of setting the reference value.

If the latest value DQa' (i) is less than the previous value DQa' (i−1) (the step S303: YES), the ECU 100 controls the drive circuit 224D such that the valve plug 224A of the impulse valve 224 rotates by a predetermined amount in the same direction as in the previous time (step S205). At this time, the control amount of the drive circuit 224D corresponding to the predetermined amount, which defines the amount of one rotation of the valve plug 224A (which is, however, merely prediction due to the failure of the rotation angle sensor 225), can be appropriately set such that there is no excessive change in the intake air amount in one rotation operation and such that the absolute intake air amount deviation DQa' converges on the theoretical, substantial, or practical minimum value as quickly as possible on the basis of experiments, experiences, theories, simulations, or the like in advance.

Incidentally, if the judgment process in the step S303 is performed for the first time, there is no previous value DQa' (i−1) of the absolute intake air amount deviation, so that an initial value set in advance is used. In the embodiment, the initial value is infinite, and after all, the first process in the step S303 is unconditionally branched to the "YES" side. Moreover, at this time, under the assumption that the valve plug 224A stands at the fully-closed position (which is actually unknown; however, it is appropriate to think so due to the reference position of the valve plug 224A), the rotational direction of the valve plug 224A is set to a direction of increasing the opening angle (in FIG. 1, the clockwise direction).

On the other hand, if the latest value DQa'(i) of the absolute intake air amount deviation is greater than or equal to the previous value DQa'(i−1) (the step S303: NO), the ECU 100 controls the drive circuit 224D such that the valve plug 224A rotates by the aforementioned rotation amount in the opposite direction to the previous time (step S206). If the process in the step S205 or step S206 is performed, the previous value DQa'(i−1) of the absolute intake air amount deviation is updated to the latest value DQa' (step S306). If the previous value is updated, the process is returned to the step S101, and the series of processes is repeated. In other words, the degree of opening of the impulse valve 224 is changed step by step through the rotation drive of the valve plug 224A until the absolute intake air amount deviation DQa' becomes less than or equal to the judgment reference value DQath.

On the other hand, in the process in the step S302, if it is judged that the obtained absolute intake air amount deviation. DQa' is less than or equal to the judgment reference value (the step S302: NO), the ECU 100 estimates the degree of opening of the impulse valve 224 on the basis of the target intake air amount Qatg (step S304). In the ROM of the ECU 100, a map for showing the estimation value of the degree of opening of the impulse valve 224 is stored in advance in a form of being associated with the engine rotation speed NE and the target intake air amount Qatg. The ECU 100 selectively obtains one value corresponding to the engine rotation speed NE and the target intake air amount Qatg from the map, thereby estimating the degree of opening of the impulse valve 224. As described above, the degree of opening of the impulse valve 224 is estimated on the basis of the target intake air amount Qatg, so that the aforementioned judgement reference value DQath is set to a value that is small enough to provide no problems in practice even if the actual intake air amount Qa is treated as the target intake air amount Qatg. Incidentally, as described above, in the embodiment, the ECU 100 also functions as one example of the "estimating device" of the present invention. Moreover, in the embodiment, the degree of opening is estimated on the basis of the target intake air amount Qatg, and the target intake air amount Qatg is treated as another example of the "predetermined index value defined as correlating with the intake air amount" of the present invention.

If the degree of opening of the impulse valve 224 is estimated, the ECU 100 fixes the degree of opening of the impulse valve 224 at a predetermined target opening (step S305). At this time, with regard to the estimated degree of opening, the correlation with the control amount of the drive circuit 224D is obtained, and the target opening is realized by predictively changing the control amount on the basis of the correlation. The target opening may be the degree of opening pursuant to the normal drive of the impulse valve 224; however, the detection accuracy of the degree of opening is easily reduced, at least in comparison with the case where the rotation angle sensor 225 is not in the failure state, so that it is desirably fixed at one degree of opening as a preferred embodiment. In view of the fact, the degree of opening fixed in the step S305 may be the fully-opened opening. If the degree of opening of the impulse valve 224 is fixed, the process is returned to the step S101, and the series of the processes is repeated.

As described above, in the third embodiment, the degree of opening of the impulse valve 224 is estimated on the basis of the target intake air amount Qatg (which is equivalent to the actual intake air amount, considering that the absolute intake air amount deviation is small) at a time point at which the absolute intake air amount deviation DQa' becomes sufficiently small. Thus, clearly as opposed to the case where the impulse valve 224 is driven without any guideline for the degree of opening of the impulse valve 224, it is possible to significantly drive the impulse valve 224. Thus, it is possible to limit the fluctuation of the intake air amount in the target cylinder.

Incidentally, in the embodiment, the restrictions on the accelerator opening Acc in the first embodiment are not imposed; however, if the accelerator opening Acc is restricted, the target intake air amount Qatg as the convergence target is limited on the upper limit side in practice. Therefore, the absolute intake air amount deviation DQa' does not have to increase (preferably, it reduces), in comparison with a case where no restrictions are imposed on the accelerator opening, and a time required to enable the actual intake air amount Qa to converge on the target intake air amount Qatg (to converge until the deviation between the two becomes less than or equal to the judgment reference value DQath) is relatively reduced, so that it is preferable.

Fourth Embodiment

Figure 6:
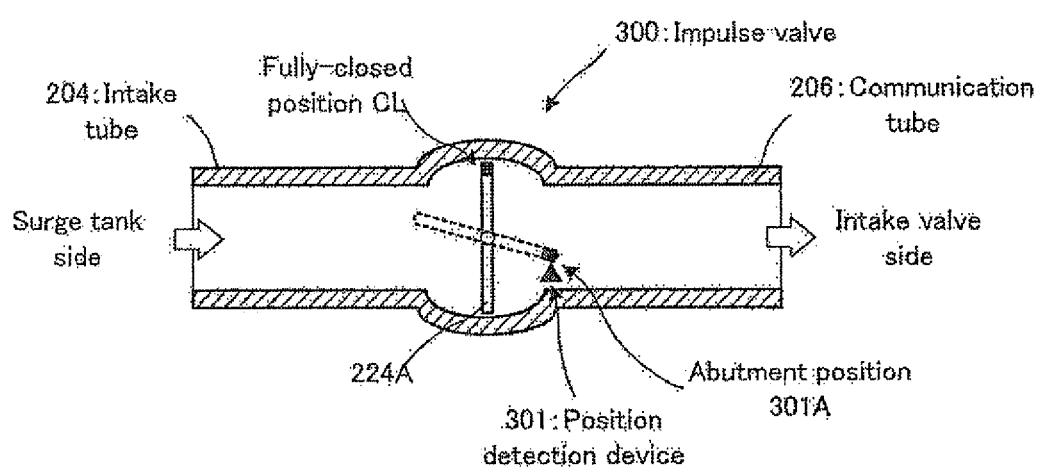
FIG. 6 is a schematic cross sectional view showing the periphery of an impulse valve in a fourth embodiment of the present invention.
Figure 7:
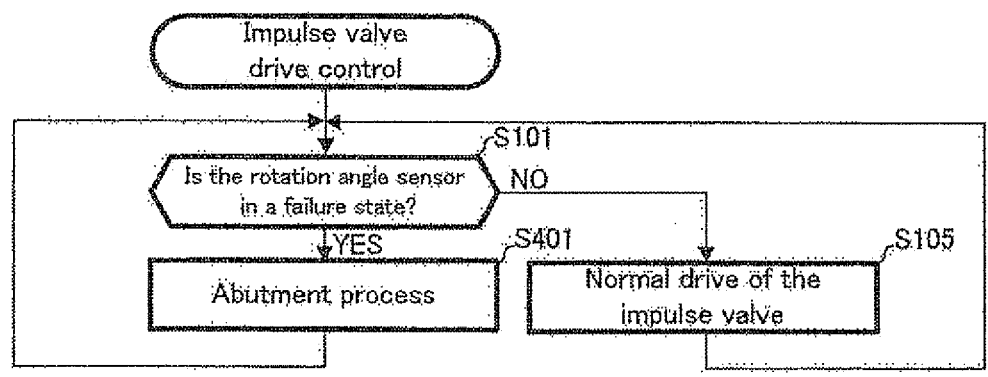
FIG. 7 is a flowchart showing impulse valve drive control for driving the impulse valve in FIG. 6.

Next, with reference to FIG. 6 and FIG. 7, a fourth embodiment of the present invention will be explained. FIG. 6 is a schematic cross sectional view showing the periphery of an impulse valve 300 in the fourth embodiment. Incidentally, in FIG. 6, the overlaps with those in FIG. 2 will carry the same referential numerals, and the explanation thereof will be omitted, as occasion demands. FIG. 7 is a flowchart showing the impulse valve drive control in the fourth embodiment. Incidentally, in FIG. 7, the overlaps with those in FIG. 3 will carry the same referential numerals, and the explanation thereof will be omitted, as occasion demands.

In FIG. 6, the impulse valve 300 is different from the impulse valve 224 in that it is provided with a position detection device 301. The position detection device 301 is a seating projection, disposed on the rotational pathway of the valve plug 224A. The installation position of the position detection device 301 is set as a position that is used for abutment on the valve plug 224A at an illustrated abutment position 301A when the opening angle of the valve plug 224A is A degrees (A>90) in the clockwise direction from the reference position. As described above, the maximum opening angle of the valve plug 224A in the normal drive of the impulse valve is 90 degrees (i.e. at the fully-opened position) in the clockwise direction on the basis of the reference position (i.e. the fully-closed opening) of 0 degrees, and the valve plug 224A does not abut on the position detection device 301 in the normal drive. On the other hand, the valve plug 224A can physically rotate around the rotating shaft 224B (whose referential numeral is omitted), so that the valve plug 224A abuts on the position detection device 301 if the restrictions in performing the normal drive are canceled to expand the range of controlling the opening angle. If the impulse valve 300 having such a structure is provided, the impulse valve drive control can be performed as shown in FIG. 7.

In FIG. 7, if it is judged that the rotation angle sensor 225 is in the failure state, the ECU 100 performs an abutment process (step S401). Here, the abutment process is a process of controlling the drive circuit 224D such that the valve plug 224A abuts on the position detection device 301 (i.e. such that the valve plug 224A is seated). Incidentally whether or not the valve plug 224A is seated on the position detection device 301 is detected by a contact sensor, which is, for example, disposed to detect the contact between the position detection device 301 and the valve plug 224A. In this case, however, it is only necessary to detect the physical contact between the position detection device 301 and the valve plug 224A, so that such a contact sensor may be not provided, and another method may be used to detect the contact. Moreover, even if the contact sensor is provided, an increase in cost can be conspicuously ignored than the provision of the reserve rotation angle sensor 225.

Incidentally, even if it is possible to detect whether or not the valve plug 224A is seated on the position detection device 301, the degree of opening of the impulse valve until the seating is unknown. Thus, it is hard to reduce a seating sound by reducing the rotation speed of the valve plug 224A immediately before the seating. However, a vehicle performs the evacuation travel when the process in the step S101 is positive, so that the seating sound is not a problem in practice. Alternatively, the rotation speed of the valve plug 224A may be reduced to the extent that the seating sound is no problem (or to the extent that an impact in the seating does not damage each device) from the beginning. If the abutment process is ended, the process is returned to the step S101, and the series of the processes is repeated.

As described above, according to the fourth embodiment, if the rotation angle sensor 225 is in the failure state, it is possible to recognize the degree of opening of the impulse valve, quickly and accurately, by seating the valve plug 224A on the position detection device 301 whose installation position is associated with the degree of opening of the impulse valve 300 in advance. At this time, of course, the installation position of the position detection device 301 is set such that the impulse valve 224 adopts the degree of opening other than at least the fully-closed opening, and the intake air for the target cylinder is ensured at least to some extent. In other words, it is possible to preferably limit the fluctuation of the intake air amount in the target cylinder.

Fifth Embodiment

Figure 8:
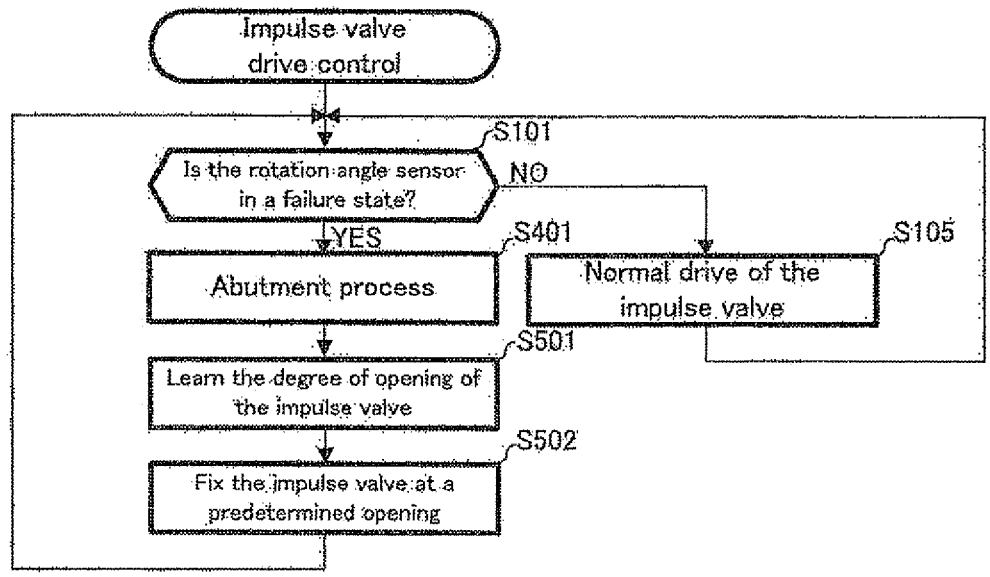
FIG. 8 is another flowchart showing the impulse valve drive control for driving the impulse valve in FIG. 6 in a fifth embodiment of the present invention.

Next, with reference to FIG. 8, an explanation will be given on another aspect of the impulse valve drive control in the aspect that the position detection device 801 is provided. FIG. 8 is a flowchart showing the impulse valve drive control in a fifth embodiment of the present invention. Incidentally, in FIG. 8, the overlaps with those in FIG. 7 will carry the same referential numerals, and the explanation thereof will be omitted, as occasion demands.

In FIG. 8, if an abutment process is performed (step S401), the ECU 100 learns the degree of opening of the impulse valve 300 (step S501). In other words, the ECU 100 stores the degree of opening of the impulse valve 300 corresponding to the abutment position 301A and the control amount of the drive circuit 224D, in association with each other. If the learning of the degree of opening is ended, the ECU 100 fixes the impulse valve at a predetermined target opening (step S502). At this time, the target opening may be the fully opened opening as a preferred embodiment, as in the third embodiment. However, considering that the detection accuracy of the degree of opening can be higher by that the degree of opening corresponding to the abutment position 301A is clearly defined in comparison with the third embodiment, for example, it may be controlled to a target opening pursuant to the normal control. If the degree of opening of the impulse valve 300 is fixed, the process is returned to the step S101, and the series of processes is repeated.

As described above, according to the fifth embodiment, by using that the degree of opening of the impulse valve 300 is clearly detected by the seating on the position detection device 301, the degree of opening of the impulse valve 300 is learnt, and the degree of opening of the impulse valve 300 is arbitrarily controlled on the basis of the learnt degree of opening. Therefore, the fluctuation of the intake air amount in the target cylinder is limited, more preferably.

Modified Example

The aspect of the position detection device 301 used for the abutment process in the fourth and fifth embodiments is not limited to the aforementioned. For example, the position detection device 301 may be disposed not inside the communication pipe 206 but near the rotating shaft of the drive motor 224C to which the rotating shaft 224B is joined, such that it abuts on a seated projection which is disposed on the rotating shaft of the drive motor 224C. In other words, the seating by the abutment may be performed on the drive motor side or one the valve plug side.

Moreover, the position detection device 301 may be constructed as a so-called one-way clutch, in which a stopping force does not act (i.e. does not abut) on the rotation in one direction of the valve plug 224A (e.g. the rotation in the direction of increasing the opening angle) and in which the stopping force acts on the rotation in the opposite direction.

Incidentally in the aforementioned various embodiments, the intake system of the engine 200 is constructed as a so-called intake manifold less system (or intake system without an intake manifold) of a one-valve type, and the impulse valves 224 and 300, which are one example of the "intake control valve" of the present invention, are commonly provided in all the cylinders 202 provided for the engine 200, in the aggregation portion of the communication pipe 206 in the downstream of the surge tank 205. Therefore, the failure of the rotation angle sensor 225 corresponding to one impulse control valve influences the intake air amount of all the cylinders. However, the impulse valve drive control in the aforementioned various embodiments do not reduce the effect at all even with respect to an intake system having another structure. For example, the impulse valve may be provided not in the aggregation portion of the communication pipe 206 but in the branch portion in which the communication pipe 206 is connected to each cylinder in the engine system 10. With reference to the aforementioned embodiments, namely, the two intake ports are provided for each cylinder, so that eight impulse valves in total may be provided. Alternatively, if the branch portion, of the communication pipe 206 is further branched in response to each intake port, the impulse valve may be provided in a portion before the communication pipe 206 is branched into each intake port (i.e. in this case, there are four impulse valves in total in the entire engine). Moreover, for example, if the engine 200 has intake manifolds which individually correspond to the respective cylinders between the surge tank 205 and the respective cylinders 202, then, the impulse valve may be disposed in each of the intake manifolds. In any cases, by taking the aforementioned various measures in the failure of the rotation angle sensor 225, the fluctuation of the intake air amount in the target cylinder (which is the fluctuation of the entire engine in some cases or the fluctuation among the cylinders in some cases) is preferably limited.

The present invention is not limited to the aforementioned embodiments, but various changes may be made, if desired, without departing from the essence or spirit of the invention which can be read from the claims and the entire specification. An apparatus for controlling a vehicle, which involves such changes, is also intended to be within the technical scope of the present invention.

INDUSTRIAL APPLICABILITY

The present invention can be applied to the drive control of an intake control valve or the like in various internal combustion engines, such as an automobile engine, provided with the intake control valve which can generate the pulsation of intake air.

The invention claimed is:

1. An apparatus for controlling a vehicle comprising: an internal combustion engine which comprises a plurality of cylinders and at least one intake control valve, which is disposed in a path of intake air connected to inside of the plurality of cylinders, which can generate pulsation of the intake air in accordance with an opening/closing state and can adjust an intake air amount as an amount of the intake air, in which the opening/closing state is controlled without seating by abutment by predetermined opening/closing control at least in a normal situation, and which allows inertia supercharging using the pulsation of the intake air by controlling the opening/closing state from a valve closing state to a valve opening state in a valve opening period of an intake valve; and sensors which are provided in a one-to-one manner together with the intake control valves, which define the opening/closing state, and which can detect degree of opening of the intake control valve referred to when the opening/closing control is performed, the intake control valve being different from a throttle valve, the apparatus having a controller that is configured to:
judge whether or not a sensor of the sensors is in a failure state;
detect a change amount of the intake air amount in each of the plurality of cylinders;

limit fluctuation of the intake air amount in a target cylinder as at least one portion of the plurality of cylinders corresponding to the sensor which is judged to be in the failure state on the basis of the change amount detected in each of the cylinders if it is judged that the sensor is in the failure state;

specify a predetermined index value defined as correlating with the intake air amount in advance on the basis of the detected change amount for each of the plurality of cylinders; and set a target value of the index value, the controller being configured to control a target intake control valve as the intake control valve corresponding to the sensor which is judged to be in the failure state such that the specified index value converges on the set target value, depending on the magnitude relationship between the specified index value and the set target value, without using the detected degree of opening of the target intake control valve.

2. The apparatus for controlling a vehicle according to claim 1, wherein the controller is configured to control the target intake control valve such that at least it is not fixed in a fully-closed state which blocks a supply of the intake air to the target cylinder.

3. The apparatus for controlling a vehicle according to claim 1, wherein the controller is configured to limit the fluctuation of the intake air by restricting a maximum value of request output of the internal combustion engine.

4. The apparatus for controlling a vehicle according to claim 3, wherein the vehicle has an operator which can be operated by a driver and in which an operation amount associated with the operation is associated with the request output, and the controller is configured to restrict a maximum value of the operation amount.

5. The apparatus for controlling a vehicle according to claim 1, wherein the controller is configured to estimate a degree of opening of the target intake control valve on the basis of the specified index value, and the controller is configured to control the target intake control valve to limit the fluctuation of the intake air amount on the basis of the estimated degree of opening.

6. The apparatus for controlling a vehicle according to claim 5, wherein the controller is configured to control the target intake control valve such that the degree of opening is maintained at a predetermined value on the basis of the estimated degree of opening.

* * * * *